(12) United States Patent
Kashino et al.

(10) Patent No.: US 7,577,334 B2
(45) Date of Patent: Aug. 18, 2009

(54) HIGH-SPEED SIGNAL SEARCH METHOD, DEVICE, AND RECORDING MEDIUM FOR THE SAME

(75) Inventors: Kunio Kashino, Tokyo (JP); Hiroshi Murase, Tokyo (JP); Gavin Smith, Cambridgeshire (GB)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1070 days.

(21) Appl. No.: 10/971,756

(22) Filed: Oct. 22, 2004

(65) Prior Publication Data

US 2005/0053355 A1    Mar. 10, 2005

Related U.S. Application Data

(62) Division of application No. 09/304,337, filed on May 4, 1999, now Pat. No. 6,826,350.

(30) Foreign Application Priority Data

| Jun. 1, 1998 | (JP) | ................................. 10-151723 |
| Aug. 28, 1998 | (JP) | ................................. 10-244162 |
| Feb. 25, 1999 | (JP) | ................................... 11-49184 |

(51) Int. Cl.
*H04N 5/91* (2006.01)

(52) U.S. Cl. .......................................... 386/68; 386/95

(58) Field of Classification Search .................... 386/46, 386/68, 69, 74, 95, 96, 111, 112
See application file for complete search history.

(56) References Cited

U.S. PATENT DOCUMENTS 4,241,329 A    12/1980    Bahler et al.

(Continued)

OTHER PUBLICATIONS

Japanese Patent Abstract, Method For Searching Minimum Value of Matching Distance in Speech Recognition; Publication No. 04-198999, Jul. 20, 1992.

(Continued)

*Primary Examiner*—Huy T Nguyen

(74) *Attorney, Agent, or Firm*—Nixon Peabody LLP

(57) ABSTRACT

A high-speed signal search method, device, and a recording medium for the same that can obtain detection results equivalent to precisely moving a window over the entire region of the input signal even when there is not precise movement of a window over the entire signal. The method provides a first step that generates a feature quantity sequence for a pre-recorded reference signal; a second step that sets the input signal window for the input signal that has been input; a third step that generates a feature quantity sequence for the input signal of this input signal window; a fourth step that calculates the input signal similarity value showing the degree of similarity between the feature quantity sequence generated in the first step and the feature quantity sequence generated in the third step; a fifth step that calculates the skip width showing the amount that the input signal can be moved; and a sixth step that determines the position of the input signal window based on the skip width calculated in the fifth step, sets the input signal window to this position, and calculates the input signal Value for each position of the input signal window by repeating the third step to the sixth step; and further, determines whether or not the reference signal exists at the position that the input signal window presently shows in the input signal based on the result of comparing the input signal similarity value and the predetermined threshold value.

9 Claims, 17 Drawing Sheets

U.S. PATENT DOCUMENTS

| | | | |
|---|---|---|---|
| 4,843,562 | A | 6/1989 | Kenyon et al. |
| 5,623,431 | A | 4/1997 | Clemow |
| 5,778,340 | A | 7/1998 | Hattori |
| 5,828,809 | A | 10/1998 | Chang et al. |
| 5,832,173 | A * | 11/1998 | Terasawa et al. ............... 386/69 |
| 5,917,990 | A | 6/1999 | Zamara et al. |
| 6,163,614 | A | 12/2000 | Chen |
| 6,314,392 | B1 | 11/2001 | Eberman et al. |

OTHER PUBLICATIONS

Japanese Patent Abstract, "Method and Device for Extracting Indexing Information From Digital Video Data"; Publication No. 10-136297, May 22, 1998.

Kashino, Kunio et al.; "Quick and/or Search of Audio Signals Using Time-Series Active Search"; *Technical Report of IEICE*; SP99-33, Jun. 1999, pp. 41-48.

Murase, Hiroshi et al.; "Fast Visual Search Using Focused Color Matching"; *IEICE*, vol. J81-D-II, No. 9, Sep. 1998, pp. 2035-2042.

Murase, Hiroshi et al.; "Fast Visual Search Using Focused Color Matching"; *Technical Report of IEICE*, PRMU97-17, May 1997, pp. 127-134.

Sugiyama, M.; "Fast Segment Search Algorithms"; *Technical Report of IEICE*, SP98-141, pp. 39-45.

"Searching for Multiple Sounds at Once"; *Acoustical Society of Japan*, Spring Meeting, Mar. 10, 11, 12, 1999. pp. 447-449.

Kashino, Kunio et al.; "Quick Audio Retrieval Based on Histogram Feature Sequences" *NTT Basic Research Laboratories*, Sep. 1998, pp. 561-563.

* cited by examiner

FIG.5

| WINDOW LENGTH | RECALL RATE | ACCURACY |
|---|---|---|
| 5.94 SECONDS | 0.99 | 0.97 |
| 11.89 SECONDS | 1.00 | 1.00 |

FIG.6

| WINDOW LENGTH | RATIO SPEED WITH EXHAUSTIVE SEARCH METHOD |
|---|---|
| 5.94 SECONDS | 22.8 |
| 11.89 SECONDS | 19.1 |

HIGH-SPEED SIGNAL SEARCH METHOD, DEVICE, AND RECORDING MEDIUM FOR THE SAME

CROSS-REFERENCE TO RELATED APPLICATIONS

This is a divisional application of U.S. patent application Ser. No. 09/304,337, filed May 4, 1999 now U.S. Pat. No. 6,826,350, which is based on Japanese Patent Applications No. 10-151723 filed Jun. 1, 1998, No. 10-244162 filed Aug. 28, 1998, and No. 11-49184 filed Feb. 25, 1999.

BACKGROUND OF THE INVENTION

1. Field of the Invention

This invention relates to a high-speed signal search method, device, and recording medium (which records this method) that searches a signal sequence for the location of a signal that is similar to a pre-recorded signal. This recording medium records a program for executing by computer this high-speed signal search method, and is computer readable. The present invention can be used, for example, for audio signal detection. That is, the present invention relates to signal detection technology which can detect and automatically record the time a specified commercial was broadcast in a broadcast audio signal, and start and stop video recording by detecting a specified theme song.

In addition, the present invention is related to technology that can automatically monitor the timing of applause, the timing of laughter, etc. in a broadcast, and search for a specified scene. Furthermore, the present invention can be applied to the detection of signals in general (video signals, etc.), not just audio signals.

This application is based patent applications filed in Japan (Japanese Patent Application, No. Hei 10-151723, Japanese Patent Application, No. Hei 10-244162, and Japanese Patent Application, No. Hei 1149184), the contents of which are incorporated herein by reference.

2. Prior Art

A matched filter is a conventional technique of detecting in a signal sequence a region having a desired signal (referred to hereinbelow as a "reference signal"). A matched filter is a technique wherein a correlation between the waveform of the area of the object input signal (referred to hereinbelow as a "window") and the waveform of a reference signal is calculated as the window moves, and when the correlation value exceeds a fixed value, it is determined that the reference signal is within the window.

However, in this method, there is the problem that because it is necessary to calculate the correlation value while precisely moving the position of the window with respect to the entire area of the input signal, the amount of calculation becomes enormous, and the calculation speed becomes slow.

In contrast, instead of using the correlation value between the input signal waveform and a reference signal waveform, there is also the technique of calculating the feature quantities (that is, a numerical value or a set of numerical values indicating the feature of the signal waveform) of the input signal waveform in this window, and carrying out a comparison between this input signal waveform and the reference signal waveform by using, for example, the correlation value or Euclidean distance between this feature quantity and the feature quantity of a reference signal waveform calculated in advance.

However, in this method as well, there is the problem that it is necessary to calculate the feature quantities while precisely moving the position of the window with respect to the entire area of the input signal, and because it is necessary to compare feature quantities, the amount of calculation becomes enormous, and the speed of calculation is slow.

SUMMARY OF THE INVENTION

In consideration of the above-described problems, it is an object of the present invention to provide a high-speed signal search method, device, and recording medium for the same which can obtain a detection result equivalent to the case of precisely moving with respect to the entire area even if the window is not precisely moved with respect to the entire area of the input signal.

In addition, another object of the present invention is to provide a high-speed signal search method, device, and recording medium for the same which can detect a signal with higher precision even when it is difficult to discriminate the signal with average features or when the signal fluctuates due to noise, etc.

Furthermore, another object of the present invention is to provide a high-speed signal search method, device, and recording medium for the same which can detect a signal with less processing than conventionally even when the signal is detected based on a plurality of reference signals.

This invention provides a first step that generates a feature quantity sequence for a pre-recorded reference signal, a second step that sets the input signal window for the input signal that has been input, a third step that generates a feature quantity sequence for the input signal of this input signal window, a fourth step that calculates the input signal similarity value showing the degree of similarity between the feature quantity sequence generated in the first step and the feature quantity sequence generated in the third step, a fifth step that calculates the skip width showing the amount that the input signal window can be moved based on the input signal similarity value calculated in the fourth step, and a sixth step that determines the position of the input signal window based on the skip width calculated in the fifth step, sets the input signal window to this position, and further calculates the input signal similarity value for each position of the input signal window by repeating the third step to the sixth step, and determines whether or not the reference signal exists at the position that the input signal window presently shows in the input signal based on the result of comparing the input signal similarity value and the predetermined threshold value.

According to another feature, the present invention provides a first step that generates a feature quantity sequence for a pre-recorded reference signal, a second step that produces a histogram of the feature quantity generated in the first step, a third step that sets the input signal window for the input signal that has been input, a fourth step that generates a feature quantity sequence for the input signal of this input signal window, a fifth step that produces a histogram of the feature quantity sequence generated in the fourth step, a sixth step that calculates the input signal similarity value showing the degree of similarity between the histogram produced in the second step and the histogram produced in the fifth step, a seventh step that calculates a skip width indicating the amount that the input signal window can be moved based on the input signal similarity value calculated in the sixth step, and an eight step that determines the position of the input signal window based on the skip width calculated in the seventh step, and sets the input signal window at that position, and further, calculates the input signal similarity value for each position of the input signal window by repeating the fourth step to the eighth step, and determines whether or not the reference signal exists at the position that the input signal window presently shows in the input signal based on the result of comparing the input signal similarity value and the predetermined threshold value.

According to another feature, the present invention provides a first step that generates a feature quantity sequence for a pre-recorded reference signal, a second step that sets the reference signal window for the feature quantity sequence generated in the first step, a third step that partitions the reference signal window set in the second step into a plurality of partitioned reference signal windows, a fourth step that generates a feature quantity sequence for the input signal that has been input, a fifth step that sets the input signal window for the feature quantity sequence generated in the fourth step, a sixth step that partitions this input signal window into a plurality of partitioned input signal windows corresponding to the plurality of partitioned reference signal windows, a seventh step that calculates the input signal similarity value showing the degree of similarity between the feature quantity sequence of each reference signal partition window and the feature quantity sequence in the partitioned input signal windows corresponding to the relevant partitioned reference signal window, an eighth step that calculates a skip width indicating the amount that the input signal window can be moved based on the input signal similarity value calculated in the seventh step, and a ninth step which determines the position of the input signal window based on the skip width calculated in the eighth step and sets the input signal window at that position, and further, calculates an input signal similarity value for each position of the input signal window by repeating the sixth step to the ninth step, and determines whether or not the reference signal exists at the position that the input signal window presently shows in the input signal based on the result of comparing the input signal similarity value and the predetermined threshold value.

According to another feature, the present invention provides a first step that generates a feature quantity sequence for a pre-recorded reference signal, a second step that sets a reference signal window for the feature quantity sequence generated in the first step, a third step that partitions the reference signal window set in the second step into a plurality of partitioned reference signal windows, a fourth step that generates a feature quantity sequence for the input signal that has been input, a fifth step that sets the input signal window for the feature quantity sequence generated in the fourth step, a sixth step that partitions this input signal window into a plurality if partitioned input signal windows corresponding to this plurality of partitioned reference signal windows, a seventh step that produces a histogram of the feature quantity sequence of each partitioned reference signal window, an eighth step the produces a histogram of a feature quantity sequence of each partitioned input signal window, a ninth step that calculates the input signal similarity value showing the degree of similarity between the histogram of each partitioned reference signal window and the histogram of the partitioned input signal window corresponding to the relevant partitioned reference signal window, a tenth step that calculates the skip width showing the amount that the input signal window can move based on the input signal similarity value calculated in the ninth step, and an eleventh step that determines the position of the input signal window and sets the input signal window at that position, and further, calculates an input signal similarity value for each position of the input signal window by repeating the sixth step to the eleventh step, and determines whether or not the reference signal exists at the position that the input signal window presently shows in the input signal based on the result of comparing the input signal similarity value and the predetermined threshold value.

According to another feature, the present invention provides a first step that generates a feature quantity sequence for a plurality of pre-recorded reference signals, a second step that generates a feature quantity sequence for the input signal that has been input, a third step that sets the input signal window for the feature quantity sequence generated in the second step, a fourth step that calculates an inter-reference signal similarity value that shows the degree of similarity between the feature quantity sequence related to a former reference signal and the feature quantity sequence related to a later reference signal for two reference signals among the plurality of reference signals, a fifth step that calculates the input signal similarity value showing the degree of similarity between the feature quantity sequence generated in the first step and the feature quantity sequence in the said input signal window for each reference signal among said plurality of reference signals, a sixth step that calculates a skip width showing the amount that the input signal window can move based on the inter-reference signal similarity value calculated in the fourth step and the input signal similarity value calculated in the fifth step, and a seventh step that determines the position of the input signal window based on the skip width calculated in the sixth step and sets the input signal window at that position, and further, calculates an input signal similarity value for each position of the input signal window by repeating the fifth step to the seventh step, and determines whether or not the reference signal exists at the position that the input signal window presently shows in the input signal based on the result of comparing the input signal similarity value and the predetermined threshold value.

According to another feature, the present invention provides a first step that generates a feature quantity sequence for a plurality of pre-recorded reference signals, a second step that produces histograms for the feature quantity sequences generated in the first step, a third step that generates a feature quantity sequence for an input signal that has been input, a fourth step that sets the input signal window for the feature quantity sequence generated in the third step, a fifth step that produces histograms for the feature quantity sequences of the input signal window, a sixth step that calculates an inter-reference signal similarity value showing the degree of similarity between the histogram related to a former reference signal and the histogram related to a later reference signal for two reference signals among the plurality of reference signals, a seventh step that calculates the input signal similarity value showing the degree of similarity between the histograms generated in the second step and the histograms generated in the fifth step for each reference signal among the plurality of reference signals, an eighth step that calculates a skip width showing the amount that the input signal window can move based on the inter-reference signal similarity value calculated in the sixth step and the input signal similarity value calculated in the seventh step, and a ninth step which determines the position of the input signal window based on the skip width calculated in the eighth step and sets the input signal window to this position, and further, calculates the input signal similarity value based on each position of the input signal window by repeating the fifth step to the ninth step, and determines whether or not the reference signal exists at the position that the input signal window presently shows in the input signal based on the result of comparing the input signal similarity value and the predetermined threshold value.

According to another feature, the present invention provides a first step that generates a feature quantity sequence for a plurality of pre-recorded reference signals, a second step that sets the reference signal window for each feature quantity sequence generated in the first step, a third step that partitions the reference signal windows set in the second step into a plurality of partitioned reference signal windows, a fourth step that generates feature quantity sequence for the input signal that has been input, a fifth step that sets the input signal window for the feature quantity sequences generated in the fourth step, a sixth step that partitions this input signal window into a plurality of partitioned input signal windows corresponding to this plurality of partitioned reference signal windows, a seventh step calculates an inter-reference similarity value that is a similarity value showing the degree of similarity between the feature quantity sequence related to a former reference signal and the feature quantity sequence related to a later reference signal for two reference signals among the plurality of reference signals, and is a similarity value showing the degree of similarity between the feature quantity sequences of each partitioned reference signal window corresponding to each other between these two reference signals, an eighth that step calculates the input signal similarity value that shows the degree of similarity between the feature quantity sequence of each partitioned reference signal window and the feature quantity sequence of the partitioned input signal window corresponding to thus partitioned reference signal window for each reference signal among the plurality of reference signals, a ninth step that calculates a skip width indicating the amount that an input signal window can move based on the inter-reference signal similarity value calculated in the seventh step and the input signal similarity value calculated in the eighth step, and a tenth step which determines the position of the input signal window based on the skip width calculated in the ninth step and sets the input signal window at that position, and further, calculates an input signal similarity value for each position of the input signal window by repeating the sixth step to the tenth step, and determines whether or not the reference signal exists at the position that the input signal window presently shows in the input signal based on the result of comparing the input signal similarity value and the predetermined threshold value.

According to another feature, the present invention provides a first step that generates a feature quantity sequence of a plurality of pre-recorded reference signals, a second step that sets a reference signal window for each feature quantity sequence generated in the first step, a third step that partitions the reference signal window set in the second step into a plurality of partitioned reference signal windows, a fourth step that generates a feature quantity sequence for the input signal that has been input, a fifth step that obtains an input signal window for the feature quantity sequence generated in the fourth step, a sixth step that partitions the input signal window into a plurality of partitioned input signal windows corresponding to the plurality of partitioned reference signal windows, a seventh step that produces a histogram of the feature quantity sequences of each of the partitioned input signal windows, an eighth step that produces a histogram of the feature quantity sequences of each of the partitioned input signal windows, a ninth step that calculates an inter-reference signal similarity value which is the similarity value showing the degree of similarity between the histogram related to a later reference signal and a histogram related to a former reference signal for two reference signals among this plurality of reference signals, and is the similarity value showing the degree of similarity between the histograms of each partitioned reference signal window corresponding to each other among the two inter-reference signals, a tenth step that calculates the input signal similarity value showing the degree of similarity between the histogram of each of the partitioned reference signal windows and the histogram of the partitioned input signal window corresponding to this partitioned reference signal window for each reference signal among the plurality of reference signals, an eleventh step that calculates a skip width indicating the amount that the input signal window can move based on the inter-reference signal similarity value calculated in the ninth step and the input signal similarity value calculated in the tenth step, and twelfth step that determines the position of the input signal window based on the skip width calculated in the eleventh step and sets the input signal window to that position, and further, calculates the input signal similarity value for each position of the input signal window by repeating the sixth step to the twelfth step, and determines whether or not the reference signal exists at the position that the input signal window presently shows in the input signal based on the result of comparing the input signal similarity value and the predetermined threshold value.

According to another feature, the present invention is a high-speed signal search device that carries out each of the above steps.

According to another feature, the present invention is an automatic video control system providing the high-speed signal search device, a video device, and a control means which controls the image movement of the video device based on the results of identification of this high-speed signal search device.

According to another feature, the present invention is a recording medium that records a program to execute each of the above steps.

According to the present invention, it is possible to obtain the detection results identical to the case when precisely moving over the whole area without precisely moving over the window for the entire area of the input signal. In addition, according to the present invention, it is possible to search for the time of the appearance of specified music or a commercial from among the signals over a long period of time of a broadcast, for example, and search for a signal including the specified signal from a signal database, for example.

In addition, according to the present invention, for a feature quantity sequence of a plurality of windows, it is possible to carry out a search taking into account the before-and-after relationship between these feature quantity sequences (in the temporal axis). Thereby, even when the signal fluctuates due to noise, etc and when the signal is difficult to discriminate with average features, it is possible to detect the signal with a higher precision. Moreover, as a setting configuration of the "plurality of windows", for example, partitioning the original window to make a plurality of windows that are set can be considered.

Furthermore, according to the present invention, it is possible to detect a signal by less processing that is conventional even which detecting a signal based on a plurality of reference signals.

Moreover, the program recorded on the recording medium of the present invention is read and executed by a computer, and thereby it is possible to detect a signal with less processing than is conventional, and an improvement in the calculation efficiency in the signal detection processing can be implemented.

BRIEF DESCRIPTION OF THE DRAWINGS

FIG. 5 is a table showing an example of the detection precision of the high-speed device of the first embodiment of the present invention.

FIG. 6 is a table showing an example of the detection speed (the speed ratio of the general hit method) of the high-speed signal search device according to the first embodiment of the present invention.

PREFERRED EMBODIMENTS OF THE PRESENT INVENTION

Figure 1:
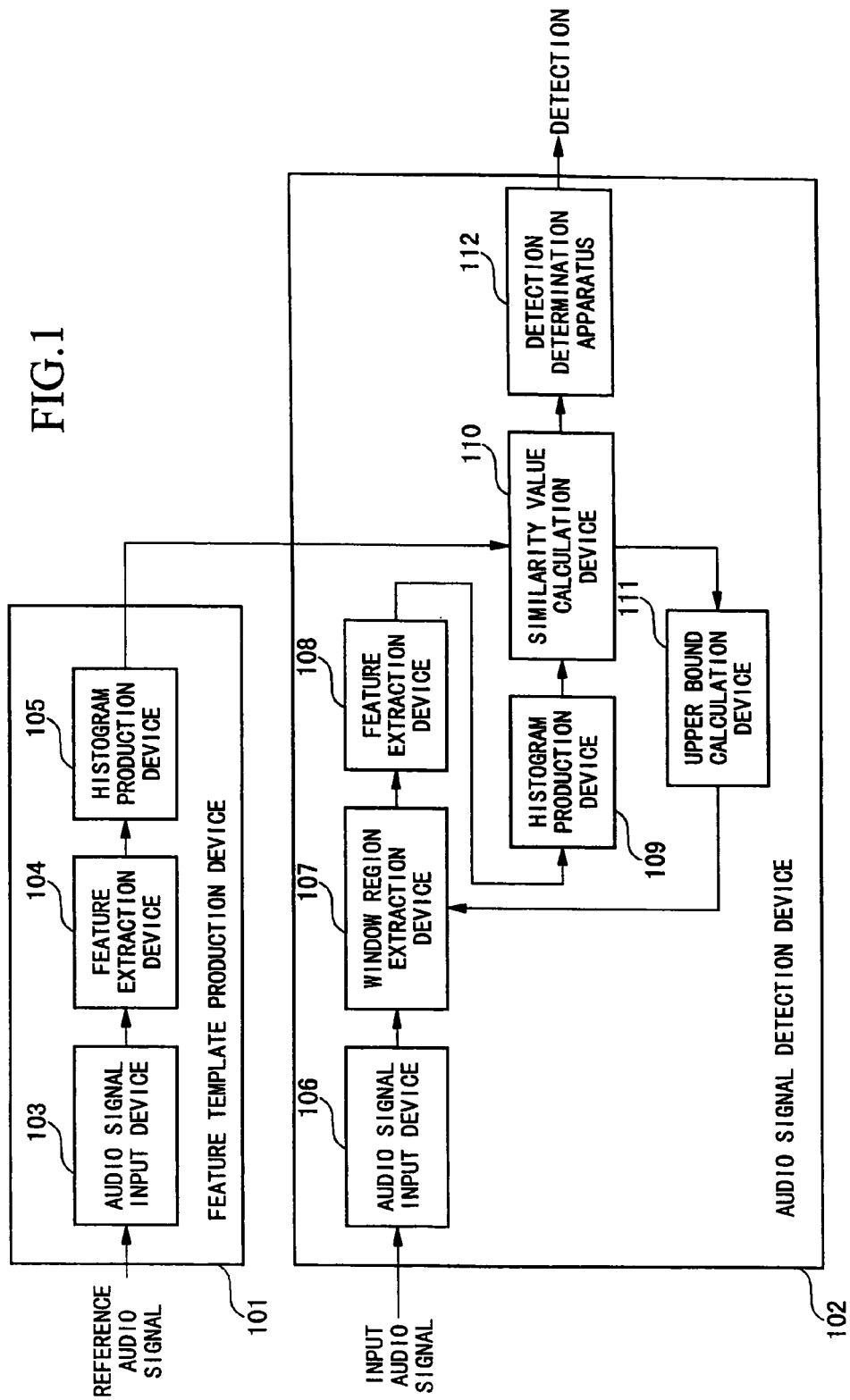
FIG. 1 is a block drawing showing an example of the structure of the high-speed signal search device according to the first embodiment of the present invention.

The embodiments of the present invention will be explained referring to the drawings.

First Embodiment

First, the first embodiment of the present invention will be explained referring to the figures. In the present invention, it is possible to use a variety of object signals for processing, but here, as one example of the processing of this object signal, an audio signal will be used. In addition, in the present invention, it is possible to use a variety of feature quantities and a variety of degrees of similarity, but here, as one example of the feature quantities (for which the effect can be considered to be high) a histogram feature of a zero-crossing number will be used, and as an example of the degree of similarity, an intersection similarity value of normalized histograms will be used.

Figure 2:
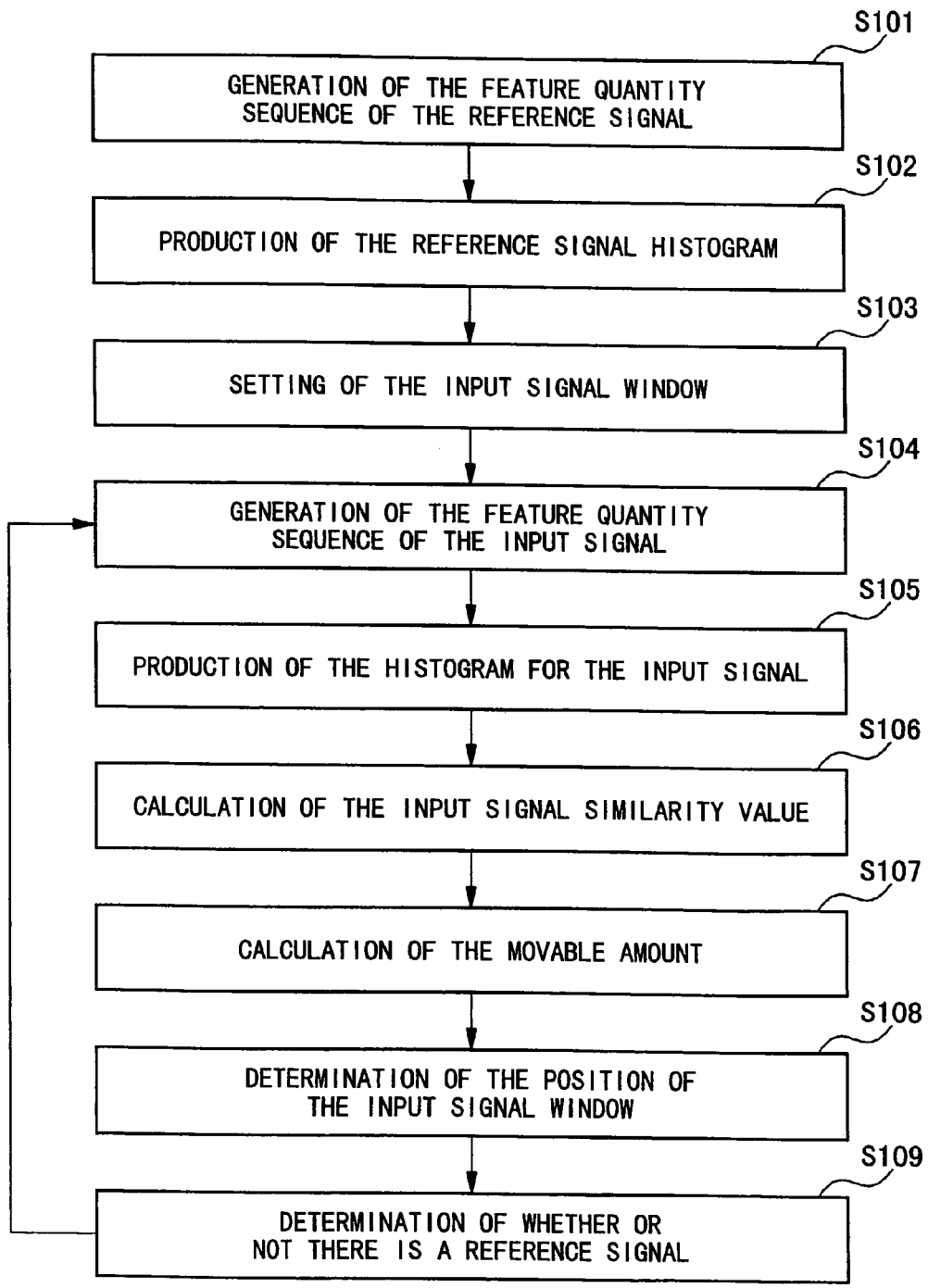
FIG. 2 is a flow chart showing an example of the operation of the high-speed signal search device according the first embodiment of the present invention.

FIG. 1 is a block diagram showing an example of the structure of the high-speed signal search device applying the high-speed signal search method according to the first embodiment of the present invention. In addition, FIG. 2 is a flow chart showing an example of the operation of the same. The present device comprises in general a feature template producing device 101 and an audio signal detection device 102.

Here, the high-speed signal search device shown in FIG. 1 specifically comprises a computer made up of a CPU (central processing unit) and its peripheral circuits. This computer carries out the functions of each device shown in FIG. 1 by being controlled by a control program recorded on a specified recording medium (magnetic disc, semiconductor memory, etc.). Moreover, it is possible to distribute this computer program via a communication circuit.

The feature template production device 101 is a device that produces a dictionary template (that is, produces a feature quantity sequence of the reference audio signal) from a reference audio signal. The dictionary template is used when detecting an input audio signal. Below, the each part of the feature template producing apparatus 101 is explained. The audio signal input device 103 reads a reference audio signal as learned data, and supplies the audio reference signal that has been read to the feature extraction device 104. For example, if the processing subsequent to the feature extraction device 104 is carried out digitally, the audio signal input device 103 comprises, for example an A/D converter. The feature extraction device 104 calculates the feature quantity (zero-crossing number) related to this audio signal (step S101), and supplies this feature quantity to the histogram production device 105.

Figure 3:
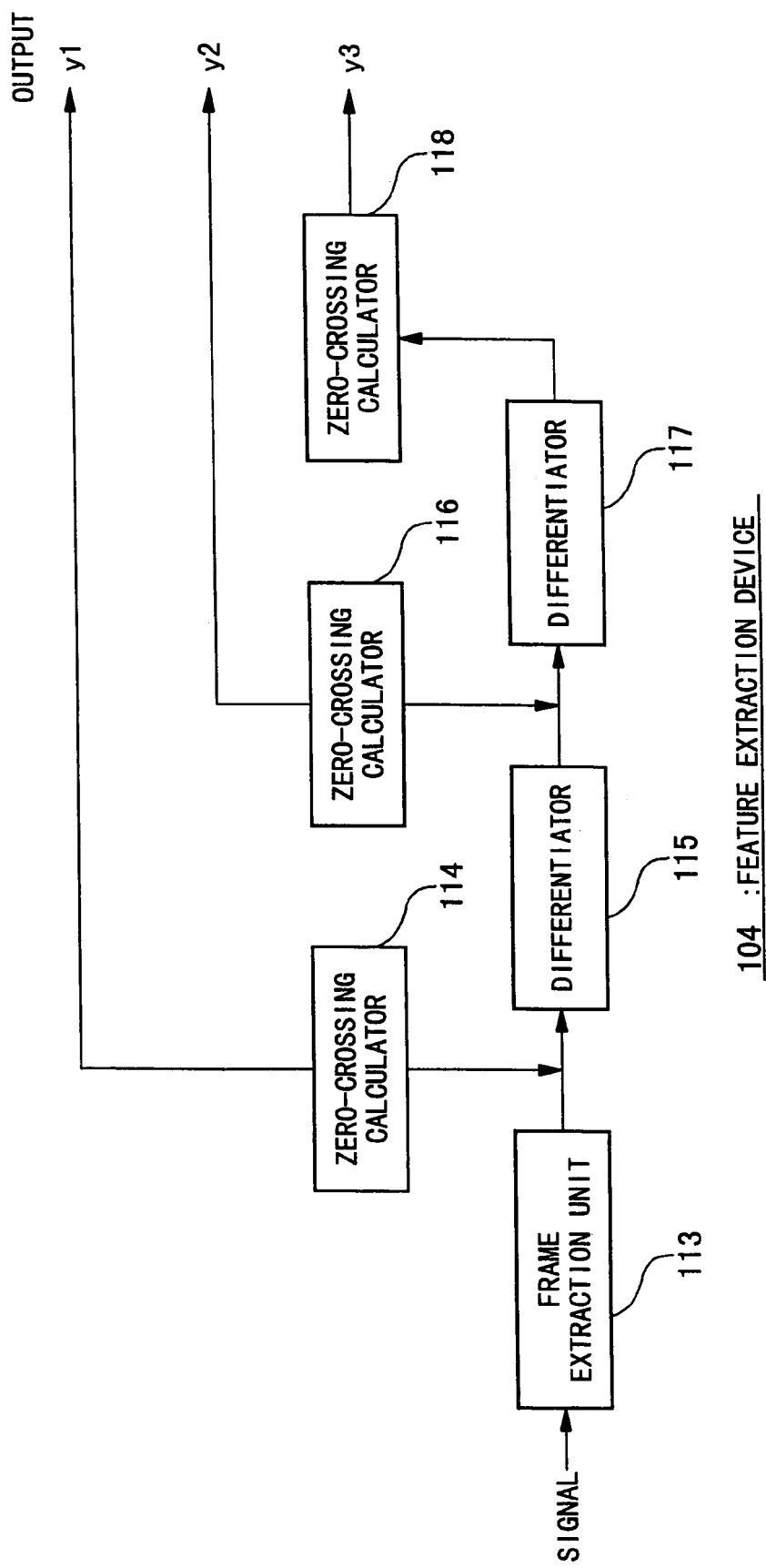
FIG. 3 is a block diagram showing an example of the structure of the feature extraction device 104.

FIG. 3 is a block diagram showing an example of the structure of the feature extraction device 104. In this figure, the frame partition unit 113 partitions at a specified time interval (for example 11 msec) the audio signal supplied by the audio signal input device 103, and supplies this partitioned audio signal to the zero-crossing calculator 114 and the differentiator 115. Here, this specified time is called a "frame". The zero-crossing calculator 114 calculates how many times the supplied audio signal (waveform) crosses the zero-level between these specified intervals, and outputs this calculation result as the output y1 of the feature extraction device 104. Here, "crossing the zero-level" denotes the changing of the signal level from a positive value to a non-positive value and the changing of the signal level from a non-positive value to a positive value.

The differentiator 115 differentiates the audio signal supplied from the frame partition unit 113, and supplies the result of differentiation to the zero-crossing calculator 116 and the differentiator 117. Here, as one example of the differentiation, this can be carried out by taking the differential between the neighboring sample values. The zero-crossing calculator 116 has a structure equivalent to that of the zero-crossing calculator 114, calculates how many times the signal supplied by the differentiator 115 crosses the above zero-level, and outputs the result of the calculation as output y2 of the feature extraction device 104. The differentiator 117 has a structure equivalent to that of the differentiator 115, and integrates the signal supplied from the differentiator 115, and supplies the result of this integration to the zero-crossing calculator 118. The zero-crossing calculator 118 has a structure equivalent to that of the zero-crossing calculator 114, calculates the number of times the signal supplied from the differentiator 117 crosses the zero-level during the above specified time, and outputs the result of this calculation as the output y3 of the feature extraction device 104. Below, the structure of the feature extraction device 104 is explained, but the structure is not limited to the structure of this feature extraction device 104, and if the device has a function of extracting the features of an audio signal from the audio signal supplied by the feature extraction device 104, any structure is possible. The features can be expressed with any number of groups of feature quantities, such as, for example, y1, y2, and y3. In the present application, the grouping of several feature quantities in this manner is called a "feature vector."

The histogram production device 105 is a device that produces the histogram of this feature vector from the sequence of feature vectors for each frame supplied from the feature extraction device 104 (step S 102). The histogram of this feature vector classifies the feature vector into several patterns, and is produced by counting the number of feature vectors included in each classification. There are many methods of classifying the feature vectors into patterns that can be considered, but the histogram production device 105 partitions the range (from minimum to maximum) of the values that the above feature vector can take (that is, the zero-crossing numbers y1, y2, y3 in each frame) into a plurality of sections, and by classifying the zero-crossings y1, y2, and y3 in each frame into any of the classifications among each of these sections (according to its value), calculates the frequency of each section. Therefore, in the case of this example, a histogram g has a number of bins that can be given by the sum of the number of sections of each feature quantity. In this manner, the learning stage is completed by producing a histogram of the reference audio signal. This histogram is supplied to the similarity value calculation device 110 as the template for the reference audio signal.

The audio signal detection device 102 detects in the input audio signal sequence the position of the audio signal that is similar to the reference audio signal. The following is a concrete explanation of the audio signal detection device 102.

The audio signal input device 106 is a device for reading an input audio signal, and has a structure equivalent to that of the audio signal input device 103. The audio signal read from the audio signal input device 106 is supplied to the window region scan extracting device 107. The window region scan extracting device 107 uses the input signal window from the audio signal supplied from the audio signal input device 106, extracts the audio signal in the area of interest that this input signal window shows (step S103), and supplies this extracted audio signal to the feature extraction device 108. The window region scan extracting device 107 extracts the audio signal while sequentially moving the position of this input signal window (that is, the area of interest), and the skip width is calculated by the upper bound calculation device 111. Moreover, while the input sequence window is being sequentially moved, the size of this input signal window is constant.

The feature extraction device 108 has a structure equivalent to that of the feature extraction device 104, and an example of this structure is shown in the FIG. 3. The feature extraction device 108 calculates the feature quantity related to the audio signal based on the audio signal extracted by the window region scan extracting device 107 (step S 104). The output of the feature extraction device 108 is supplied to the histogram production device 109. The histogram production device 109 has a structure equivalent to that of the histogram production device 105, and produces a histogram h for the feature quantities (that is, the zero-crossing numbers y1, y2, and y3) in each frame supplied by the feature extraction device 108 by calculating the frequency of the zero-crossing numbers (step S 105), and supplies this histogram h to the similarity value calculation device 110.

The similarity value calculation device 110 calculates the similarity value between the normalized histogram h supplied from the histogram production device 109 and the normalized histogram g supplied by the feature template production device 101 (step S 106). Many definitions of a similarity value are possible, but here, as one example, the intersection similarity value shown in the following equation is used:

$$S(g, h) = \frac{1}{D} \sum_{j=1}^{L} \min(g_j, h_j) \qquad (1)$$

Here, D is the total frequency of the histogram, L is the number of histogram bins, $g_j$ is the value of the $j^{th}$ bin of the histogram g, $h_j$ is the value of the $j^{th}$ bin of histogram h, and min ($g_j$, $h_j$) is the smaller value between $g_j$ and $h_j$. The calculated similarity value is supplied to the upper bound calculation device 111 and the detection determination device 112.

Moreover, a degree of similarity that shows the degree of correlation between histograms is not limited to the above intersection similarity value, but for example, can use a value corresponding to the distance between histograms. Here, the "value corresponding to the distance between histograms is, for example, the value totaling over all bins the absolute value of the difference of frequencies of each bin corresponding to each other in the normalized histograms g and h ($\Sigma |g_j - h_j|$).

Figure 4:
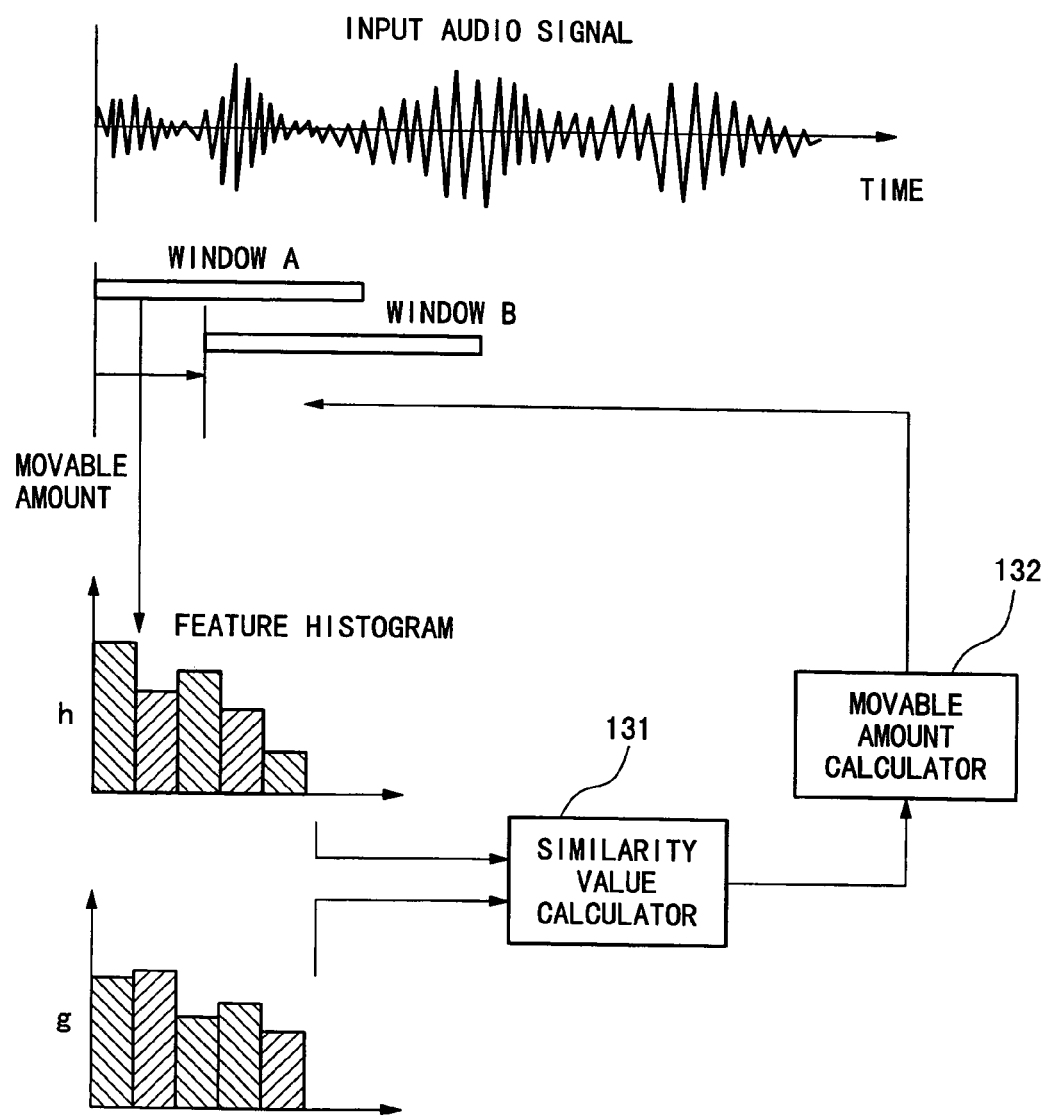
FIG. 4 is an explanatory diagram showing an example of the similarity value calculation during the movement of the window.

The upper bound calculation device 111 calculates the upper bound of the similarity value at each point for each point for the neighboring points that have a similarity value based on the similarity value already obtained. For example, in the case of the intersection similarity value of the histograms, as shown in FIG. 4, the difference between the histogram of window A and the histogram of window B (set corresponding to the time series of the input audio signal) depends only on the number of samples included in the region not common between window A and window B. That is, like the intersection similarity value, in the normalized histogram, when the similarity value is determined based on the results of the comparison for each bin found for the frame units accumulated for all bins, the change in the similarity value produced as the input signal window moves is necessarily limited to the proportion that the number of samples not in common between input signal windows occupies with respect to the total number of samples (in this case, the number of frames in the input signal window) before and after moving. If this quality is used, the similarity value between the feature quantities of the input audio signal within a given input signal window and the feature quantity of a give reference signal will become limited to being lower than a specified upper bound (in the case of distance, above a lower bound) by the similarity value in the neighborhood of the input signal window (the feature quantity of the input audio signal in an input signal window and the feature quantity of a given reference signal).

As an example, consider the case of finding a region wherein the similarity value is above a given threshold value. In this case, when finding (carrying out checking) a similarity value between a feature histogram of the input audio signal at a given time and the histogram produced by the feature template production device 101, the upper bound of the similarity value at the point in the input audio signal in the neighborhood of this time can be found by calculation, not by actually finding (carrying out checking) the similarity value of the histogram of the feature template at these points in time. That is, in the bin wherein the upper bound of the similarity value is below a threshold value, it can be omitted because the operation of finding the similarity value is not necessary. For example, in the case of this example, if S (step S 106 in FIG. 2, and process 31 in FIG. 4) is the similarity value found for the histogram h for the input audio signal at a given time and the histogram g produced by the feature template production device 101, $\theta$ is the threshold value of the similarity value being sought, and D is the number of frames in the input signal window, then when S<$\theta$, the amount the signal input window can move is calculated as: floor $\{D(\theta-S)\}+1$ frame (step S 107 of FIG. 2, and process 32 in FIG. 4). Here, floor { } denotes the cutoff for rounding off the number. This skip width is supplied by the window region scan extracting device 107. The window region scan extracting device 107 moves the input signal window based on this skip width (step S 108).

Moreover, in this processing, it is very important to set the threshold value $\theta$ at an appropriate value. However, because the appropriate threshold value $\theta$ depends on the input audio signal and the reference audio signal, and the search parameters, it is not advantageous to make this threshold value a single fixed value. Thus, here the threshold value $\theta$ is set at $\theta=m+cv$, based on mean m and variation v of the similarity value when the search was carried out in the direction of the time axis. Here, m and v are set by sampling the feature vector of the input audio signal preceding the search and taking the statistics of the similarity value. In addition, c is a specified parameter.

In this manner, the present device moves in sequence the input signal window, and the same process is repeated until the input signal window passes the end of the of the input audio signal. At this time, if the similarity value supplied by the similarity value calculation device 110 exceeds the above threshold value $\theta$, the detection determination device 112 determines that the audio signal in the input signal window is equivalent to the reference audio signal, and outputs the position (that is, the generation time of this audio signal) of this input signal window as the result (step S 109). By the above processing, it is possible to detect the position (generation time) of the reference audio signal from the input audio signal.

Using the present embodiment, an experiment was carried out wherein, a part that is similar to a pre-recorded reference audio signal was detected in two-minute input audio signals actually recorded from a television broadcast. Moreover, the reference audio signals used as the recorded data were part of an input audio signal recorded separately and input. The reference audio signals had a length of 5.94 seconds and 11.89 seconds, and the experiment was carried out using audio signals that had 109 differences: The detection precision is shown in FIG. 5, and the comparison of the number of times of checking with the technique of checking while shifting the total hits is shown in FIG. 6. Moreover, in FIG. 5, the recall factor and precision are calculated by the following equations:

recall factor=(number of correct detection)/(number of correct locations)

precision=(number of correct detection)/(total number detected)

Second Embodiment

Next, the second embodiment of the present invention will be explained referring to the figures.

In the first embodiment, as a method for detecting the position of a signal similar to a pre-recorded reference signal, the method of calculating the feature quantities of a reference signal and the input signal, and identifying the similarity value of both was explained. Further, in the first embodiment, a method was explained wherein the search speed was increased by decreasing the amount of calculation by calculating a similarity value of the feature quantities of the reference signal and the input signal using a specified time of the window (region of interest) as the unit, and determining the amount of movement of the window based on the upper bound of the similarity value in the neighboring area of interest of this area of interest for which the similarity value calculation was made.

However, in the method of the first embodiment, there are the problems that when the signal fluctuates due to noise, etc., and the signal is difficult to discriminate using average features (for example, the audio signal of an announcement), the signal cannot be detected adequately.

Thus, in the second embodiment, a high-speed signal search method is explained wherein it is possible to detect the signal at a higher precision even when the signal fluctuates due to noise, etc., and when the signal is difficult to discriminate with average features.

Figure 7:
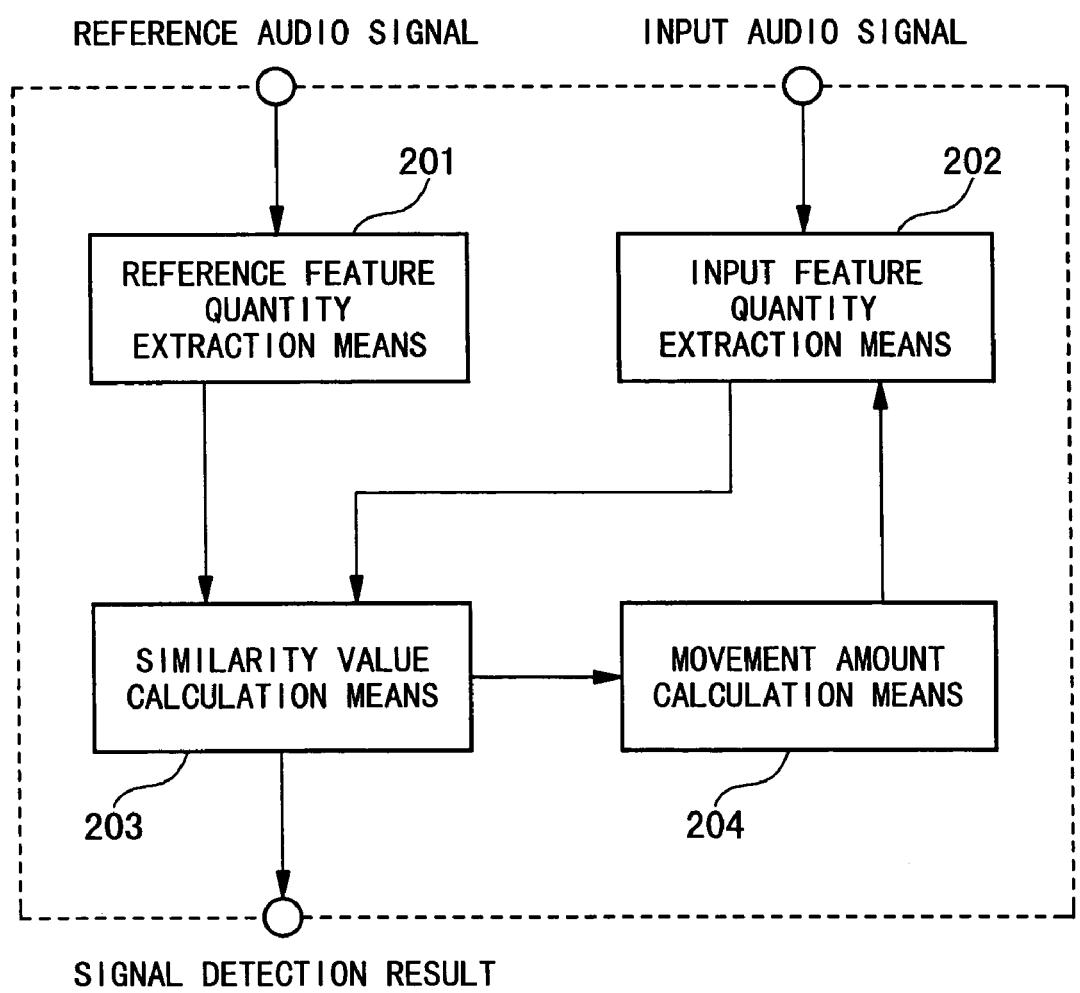
FIG. 7 is a block diagram showing an example of the structure of the high-speed signal search device according to a second embodiment of the present invention.

FIG. 7 is a block diagram showing an example of the structure of the high-speed signal search device applying the high-speed signal search method according to the second embodiment of the present invention. In the present invention, it is possible to use a variety of object signals for processing, but here, as one example of the processing of this object signal, an audio signal will be used. The present device comprises the reference feature quantity extraction means 201, the input feature quantity extraction means 202, the similarity value calculation means 203, and the movement quantity calculation means 204. The present device inputs a pre-recorded reference audio signal (that is, the sample of the audio signal to be searched for) and an input audio signal (that is, the audio signal that is searched for), and detects locations wherein the similarity value of the reference audio signal and the input audio signal exceeds a specified threshold value $\theta$.

Here, the high-speed signal search device shown in FIG. 7 is concretely structured from a computer comprising a CPU (central processing unit) and its peripheral circuits. This computer carries out the function of each device shown in FIG. 7 by being controlled by a control program recorded on a specified recording medium (magnetic disc, semiconductor memory, etc.). Moreover, it is possible to distribute this computer program via a telecommunication circuit.

In FIG. 7, the reference feature quantity extraction means 201 sets a plurality of windows (referred to hereinbelow as the "reference signal windows") based on the feature quantity sequences generated from the reference audio signal, partitions this reference signal window into a plurality of windows (referred to hereinbelow as the "partitioned reference signal windows"), and supplies this feature quantity sequence in each partitioned reference signal window to the similarity value calculation means 203. The input feature quantity extraction means 202 sets the window (referred to hereinbelow as the "input signal window") based on the feature quantity sequences generated from the input audio signal, and partitions this input signal window into a plurality of windows (referred to hereinbelow as the "partitioned input signal windows"), and supplies the feature quantity sequence in each of the partitioned input signal windows to the similarity value calculation means 203.

The similarity value calculation means 203 calculates a similarity value (referred to hereinbelow as the "input signal similarity value") between the feature quantity sequences of each reference input partitioned window and the feature quantity sequences in each partitioned input signal window (referred to hereinbelow as the "input signal similarity value"). Additionally, the similarity value calculation means 203 determines whether there is a reference audio signal at the position that the input signal window presently shows based on whether the calculated input signal similarity value is greater than a threshold value θ. When there is a reference audio signal at the position the input signal window presently shows, the similarity value calculation means 203 outputs the position (time, etc.) that the input signal window presently shows as the result of the signal detection. In addition, the similarity value calculation means 203 supplies the similarity value necessary to calculate the skip width of the input signal window and supplies it to the movement quantity calculation means 204.

The movement quantity calculation means 204 calculates the upper bound of the similarity value related to the neighboring input signal window of the input signal window corresponding to this similarity value based on the similarity value supplied from the similarity value calculation means 203. Additionally, the movement quantity calculation means 204 calculates the skip width of the input signal window based on this upper bound, and supplies this skip width to the input feature quantity extraction means 202. Thereby, the input feature quantity extraction means 202 moves the position of the input signal window only the skip width supplied from the movement quantity calculation means 204. In this manner, the present invention moves in sequence the input signal window, and repeats in the same manner the each of the above processes for the feature quantity sequences generated in the input audio signal of the input signal window after being moved.

Figure 8:
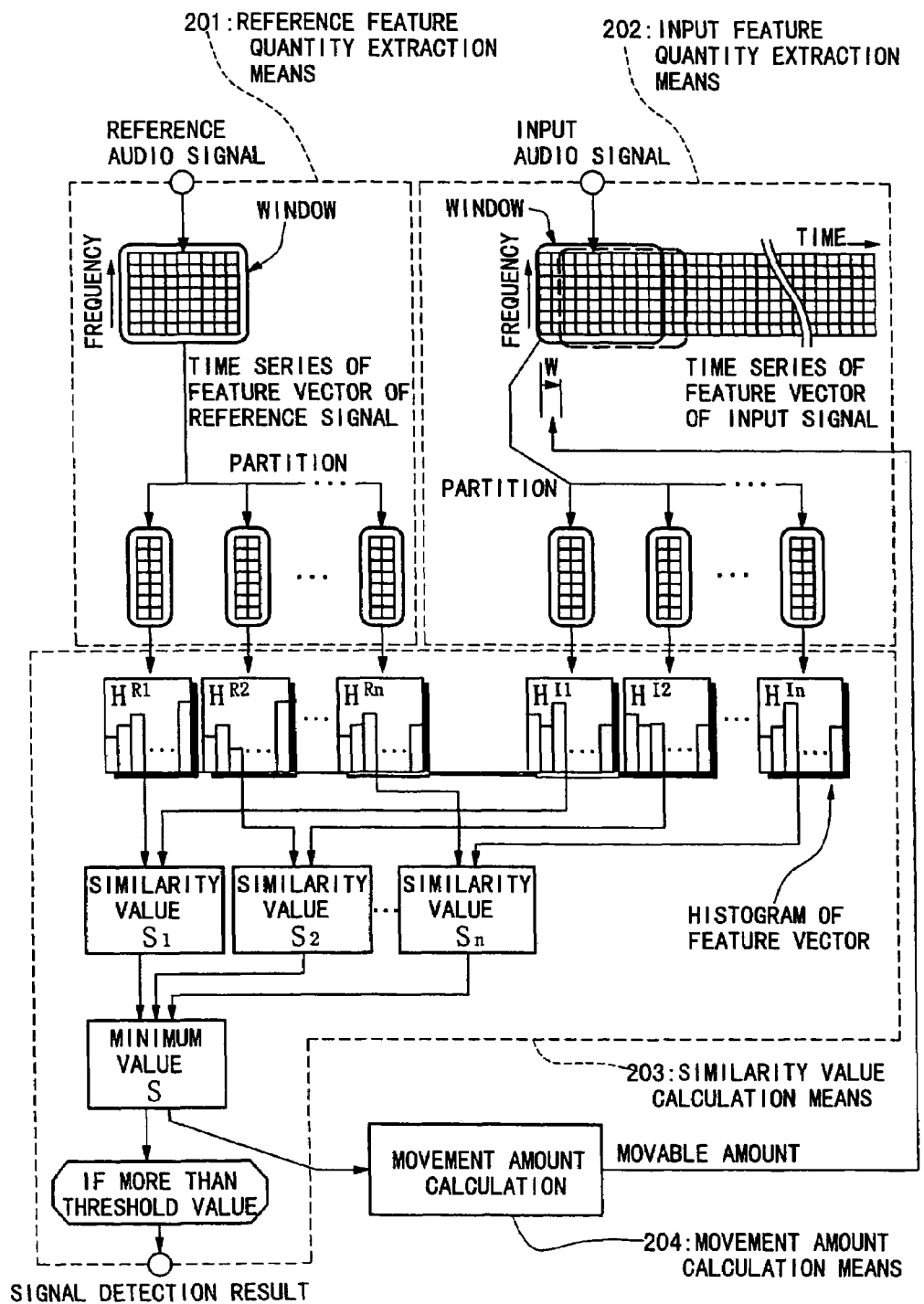
FIG. 8 is an explanatory drawing showing an example of the processing of the high-speed signal search device according to the second embodiment of the present invention.
Figure 9:
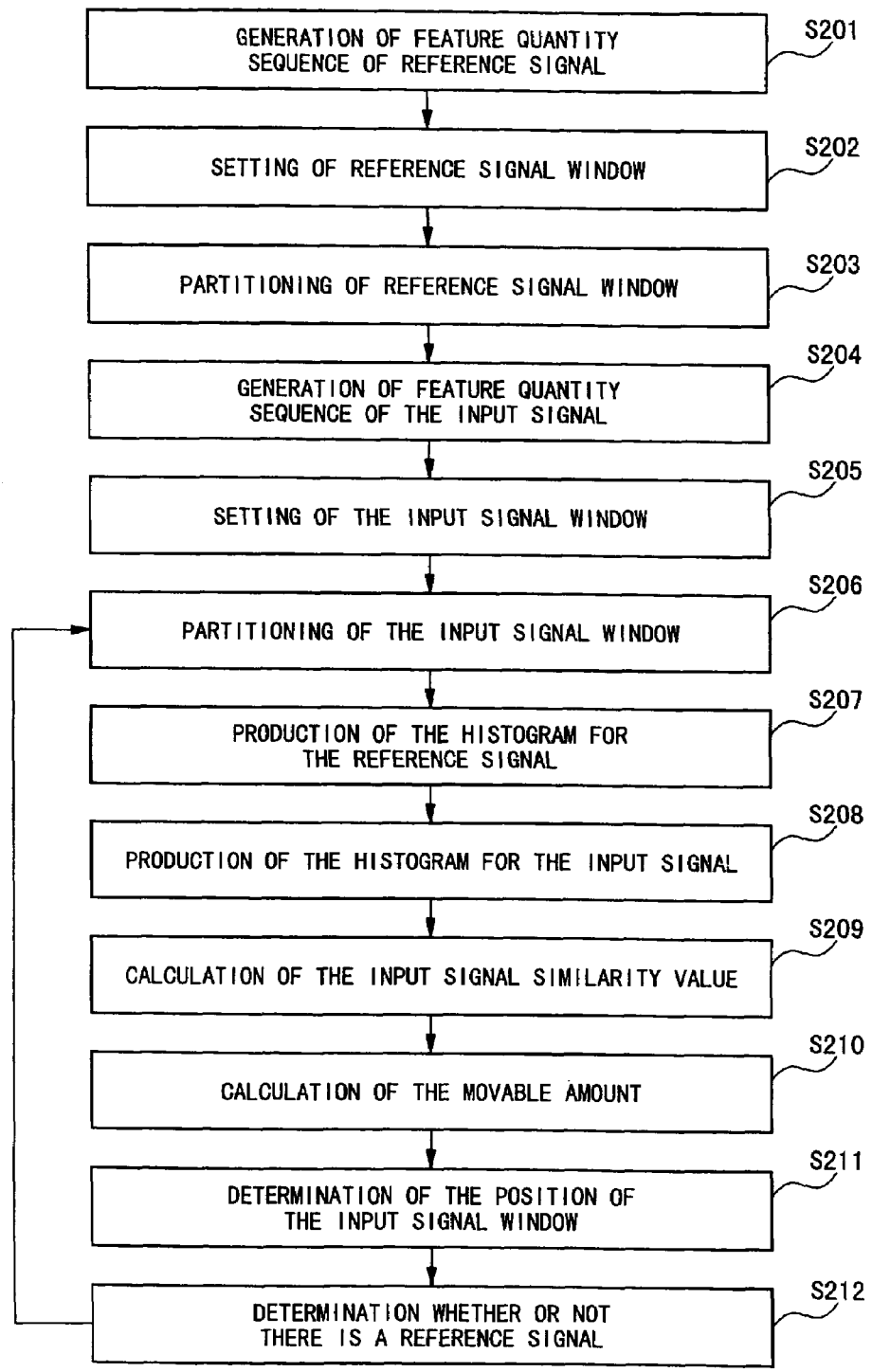
FIG. 9 is a flowchart showing an example of the operation of the high-speed signal search apparatus according to the second embodiment of the present invention.

Next, the operation of the present device will be concretely explained referring to FIG. 8 and FIG. 9.

The reference feature quantity extraction means 201 first reads the pre-recorded reference audio signal. Next, the reference feature quantity extraction means 201 carries out extraction of the feature quantities for the reference audio signal which was read (step S 201). In the present invention, it is possible to use a variety of feature quantities, but here, as one example of the feature quantity, a spectral feature will be used. In this case, the extraction of the feature quantity can be carried out using, for example, a band-pass filter.

Figure 10:
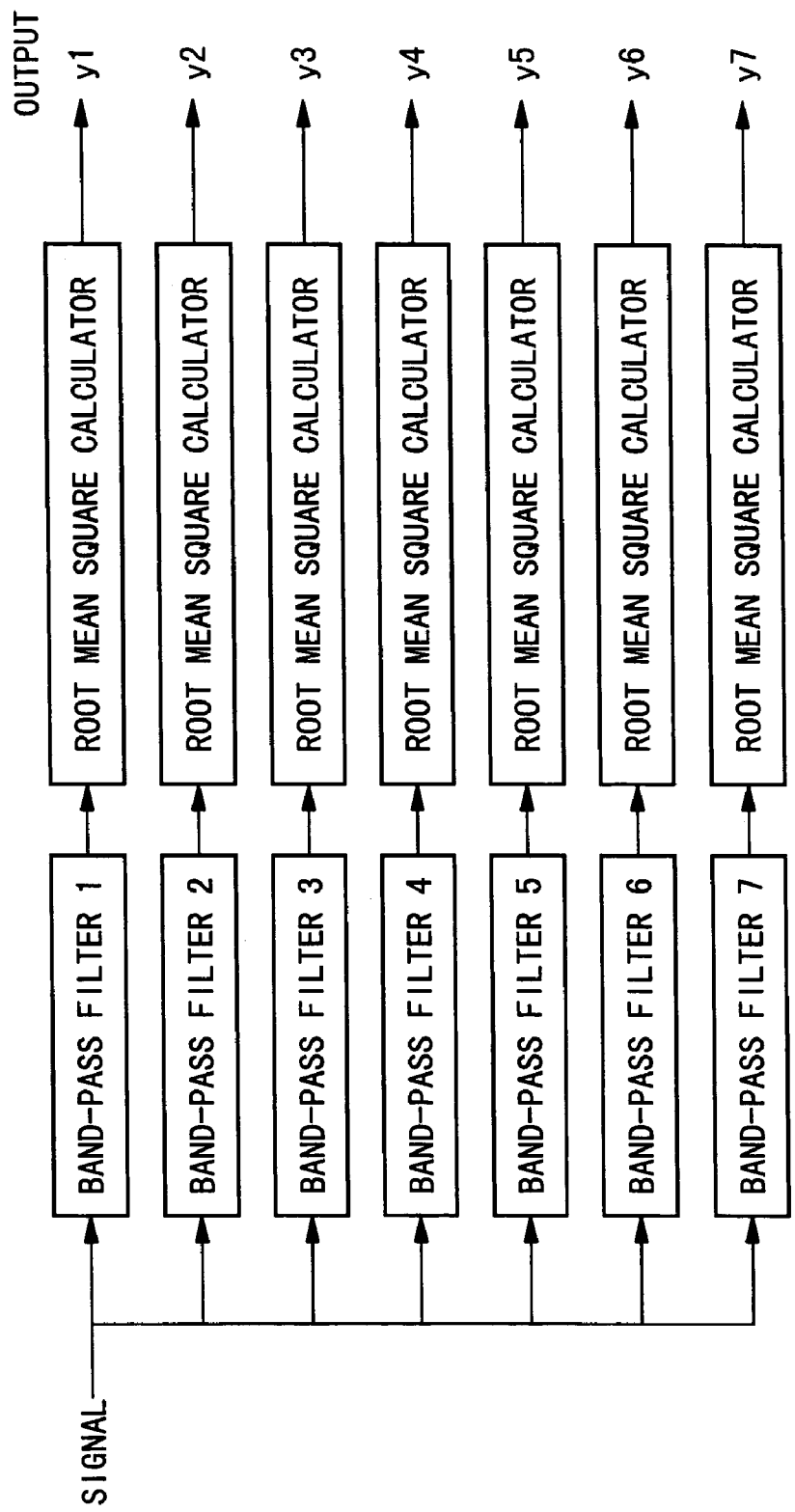
FIG. 10 is a block diagram showing an example of the structure for extracting a spectral feature.

A concrete example of the feature quality extraction will be explained below. For example, when a specified audio signal of about 10 seconds is to be searched for in a broadcast signal for television or radio, etc., when the feature quantities are extracted with the device shown in FIG. 10, good results can be obtained. That is, 7 band-pass filters are set so that the central frequencies of these band-pass filters have equal intervals on a logarithmic axis, a 60 msec time window is set for the output waveform of each band-pass filter, and the mean value of the square of the output waveform in this time window is calculated. The 7 average values obtained in this manner are grouped into a 7-dimensional feature vector. While this time window is shifted by 12 msec units, the calculation of the sequence feature vector is carried out. In this case, one feature vector at a time is obtained every 12 msec. In the reference feature quantity extraction means 201, in this manner, the feature vector having the component of each frequency band of the reference audio signal an element is obtained in a sequential time series. Moreover, the following method can be considered. That is, in this method, the 7-dimension vector is obtained by setting 7 band-pass filters so that the central frequencies of these band-pass filters have equal intervals on a logarithmic axis, a 60 msec time window is set for the output waveform of each band-pass filter, the difference between the read output and the prior read output is calculated, the average value of the square of the output waveform is calculated, and the 7 average values are grouped to make a 7-dimensional feature vector.

Next, the reference feature quantity extraction means 201 sets the window for the time series of these feature vectors (step S 202). The reference feature quantity extraction means 201 first sets one window (reference signal window) for the entire reference audio signal (refer to "window" in the reference feature quantity extraction means 201 in FIG. 8). Moreover, FIG. 8 schematically shows that the horizontal direction in the reference signal window corresponds to the time axis, and the feature vectors are obtained in sequence in the direction of this time axis.

Next, the reference feature quantity extraction means 201 partitions the reference signal window into a plurality of partitioned reference signal windows in the direction of the time axis (step S 203; refer to "partition" in the reference feature quantity extraction means 201 of FIG. 8). Moreover, the number of partitions is appropriately determined according to the condition of the signal which is the object of processing, etc., but here, for example, there are 8 partitions. Thereby, the reference feature quantity extraction means 201 supplies in sequence the feature quantities (that is, the time series of the feature vector) included in each partitioned reference signal window to the similarity value calculation means 203.

The input feature quantity extraction means 202 first reads the input audio signal. Next, the input feature quantity extraction means 202 carries out detection of the feature quantities for the read input audio signal (step S 204). Here, the input feature quantity extraction means 202 extracts the feature quantity (that is, the time series of the 7-dimensional vector) by the same method (refer to FIG. 10) as the reference feature quantity extraction means 201. Thus, here, the explanation of this will be omitted.

Next, the input feature quantity extraction means 202 sets the windows for the time series of these feature vectors (step S 205). The input feature quantity extraction means 202 first sets the length of the windows (the input signal windows) for the input audio signal so as to be the same as those of the above reference signal windows (see "windows" in the input feature quantity extraction means 202 in FIG. 8). Moreover, FIG. 8 shows schematically that the horizontal direction of the input signal window corresponds to the time axis, and the feature vectors are obtained in sequence in the direction of this time axis.

Moreover, at the commencement of the processing, the position of the input signal window is set at the head of the feature quality sequence produced from the input audio signal, but as the processing proceeds, by a method described below, this feature quantity is moved in sequence in the direction of the time axis. The amount of this movement is calculated by the movement quantity calculation means 204.

Next, the input feature quantity extraction means 202 partitions the input signal window into a plurality of partitioned input signal windows in the direction of the time axis (step S 206; see "partition" in the input feature quantity extraction means 202 in FIG. 8). Moreover, the number of partitions of the input signal window is equal to the number of partitions of the reference signal window. Thereby, the input feature quantity extraction means 202 outputs to the similarity value calculation means 203 in sequence the feature quantities (that is, the time series of the feature vector) included in each partitioned input signal window.

The similarity value calculation means 203 reads in sequence the time series of the feature vector partitioned in the partitioned reference signal window, and reads in sequence the time series of the feature vector partitioned in the partitioned input signal window from the input feature quantity extraction means 202.

Next, the similarity value calculation means 203 produces a histogram of the feature vector based on the time series of the feature vector of the partitioned reference signal window (step S 207), and produces the histogram of the feature vector based on the time series of the feature vector in the partitioned input signal window (step S 208). These histograms are all produced by partitioning the range (from the smallest value to the largest value) of the values that each element of the feature vector can take into a plurality of bins (sections). For example, the range of values that each of the elements can take (here, assumed to be "bins A, B, C") are partitioned into three bins, and if the number of elements of each feature vector is 7, then the 7 elements are respectively distributed among the bins A, B, and C. Therefore, when considering one feature vector, as a combination of the elements of this feature vector from (A, A, A, A, A, A, A) showing all the 7 elements included in bin A to the (C, C, C, C, C, C, C,) showing all the 7 elements included in bin C, a total combination of 3 to the power of 7 can be conceived. From the above, the total number of bins (that is, the number of bins disposed on the horizontal axis of the histogram) of the histograms of the feature vectors is 3 to the power of 7. Therefore, when setting the horizontal axis of the histogram in this manner, each feature vector is classified into one among these 3 to the power of 7 number of bins.

By the above described method, the similarity value calculation means 203 produces the respective histograms for the feature vectors (partitioned in the direction of the time axis) supplied from the reference feature quantity extraction means 201 and the feature vectors (partitioned in the direction of the time axis) supplied from the input feature quantity extraction means 202. Here, these histograms are $G^1$, $G^2, \ldots, G^n$ and $H^1, H^2, \ldots, H^n$, where n (1~n is referred to hereinbelow as the "number of partitions") is the number of partitions of the original windows (reference signal window and input signal window), G denotes the histogram (referred to hereinbelow as the "reference signal histogram"), and H denotes the histogram (referred to hereinbelow as the "input signal histogram") produced from the feature vector of the input audio signal.

Next, the similarity value calculation means 203 calculates the similarity value between the reference signal histogram and the input signal histogram having an equal number of partitions (step S 209). In the present invention, it is possible to use various similarity values, but here the intersection similarity value is used as an example of this similarity value. Here, the similarity value $S_k$ (of the reference signal histogram and the input signal histogram) in the partition number k is defined in the following equation:

$$S_k = \frac{1}{D_k} \sum_{j=1}^{L} \min(g_j^k, h_j^k) \qquad (2)$$

Here, $D_k$ denotes the total number of histograms of the partition number k, L denotes the number of histogram bins (in the above example, 3 to the power of 7), $g_j^k$ denotes the value of the $j^{th}$ bin of the $k^{th}$ histogram $G_k$, $h_j^k$ denotes the value of the $j^{th}$ bin of the $k^{th}$ histogram $H^k$, and min $(g_j^k, h_j^k)$ denotes the smaller between $g_j^k$ and $h_j^k$.

In addition, the similarity value S (that is, the similarity value between the reference signal window and the input signal window) for all windows is defined by the following equation (below, this similarity value S is referred to as the "total similarity value").

$$S = \min(S_1, S_2, \ldots S_n) \qquad (3)$$

Here, min $(S_1, S_2, \ldots, S_n)$ denotes the minimum value among $S_1, S_2, \ldots, S_n$.

The calculation of the similarity value $S_k$ is carried out one at a time (for example, in the order from the smallest k). If the calculated similarity value $S_k$ is below the threshold value θ, based on Eq. 3, the minimum value of the total similarity value S is clearly below the threshold value θ, and thus it is not necessary to carry out the calculation of the subsequent similarity values $S_{k+1}$, $S_{k+2}$, $S_{k+3}$. Additionally, the movement quantity calculation means 204 supplies the smallest value among the similarity values calculated up to this point to the movement quantity calculation means 204.

In contrast, if all of the similarity values $S_1$~$S_n$ are larger than the threshold value θ, then the total similarity value S will be larger than the threshold value θ. This means that at the present position of the input signal window for the (feature vector of the) input audio signal the reference audio signal has been detected. Thus, the similarity value calculation means 203 outputs this present position (time) as part of the signal detection results. In addition, in this case as well, the similarity value calculation means 203 supplies the total similarity value S to the movement quantity calculation means 204.

The movement quantity calculation means 204 first reads the total similarity value S supplied from the similarity value calculation means 203. Next, the movement quantity calculation means 204 calculates the skip width w (step S 210). Here, the skip width w is found by the following equation:

$$w = \begin{cases} \text{floor}(D(\theta - S)) + 1 & (S < \theta) \\ 1 & (\text{otherwise}) \end{cases} \qquad (4)$$

Here, the unit of the skip width w is the number of feature vectors, floor ( ) denotes the cutoff for rounding off the number, D is the total frequency of the histogram of the feature vector in the $k^{th}$ partitioned window (the partitioned reference signal window and the partitioned input signal window) satisfying $S=S_k$, and θ denotes the above-described threshold value.

Eq. 4 means that if S<θ at the present point, even if the input signal window is moved at least one feature vector interval (w−1), the total similarity value S will not exceed the threshold value θ. This can be easily understood by considering the case where the feature vector that is outside the input signal window is contributing nothing to the overlap of all histograms when the input signal window is moving and the case where the feature vector within the input signal window is contributing all of the overlap to histograms (that is, when the total similarity value S arrives most quickly at the threshold value θ). That is, because in this kind of case the similarity value increases the most, under this supposition, when the input signal window is moved at least the feature vector interval (w−1), the upper bound of the total similarity value S becomes the threshold value θ. Due to this, if S<θ, then the amount of movement of the feature vector w for which the total similarity value S may exceed the threshold value θ is made the skip width.

In contrast, if S≧θ, in order to find the local peak of the similarity value, then w=1, and a search is carried out that does not skip any windows.

The skip width w output from the movement quantity calculation means 204 is supplied to the input feature quantity extraction means 202. The input feature quantity extraction means 202 moves the input signal window only one feature vector interval w (step S 211; refer to the window with the broken line in the input feature quantity extraction means 202 in FIG. 8). Subsequently, the above-described processing (setting a plurality of partitioned windows, producing histograms, calculating similarity values, calculating the skip width, etc.) are repeated in the same manner (step S 212). In addition, by moving the input signal window, when the input signal window passes the end of the input audio signal (of the time series of the feature vector), the search processing is ended because the entire input audio signal has been searched.

Figure 11:
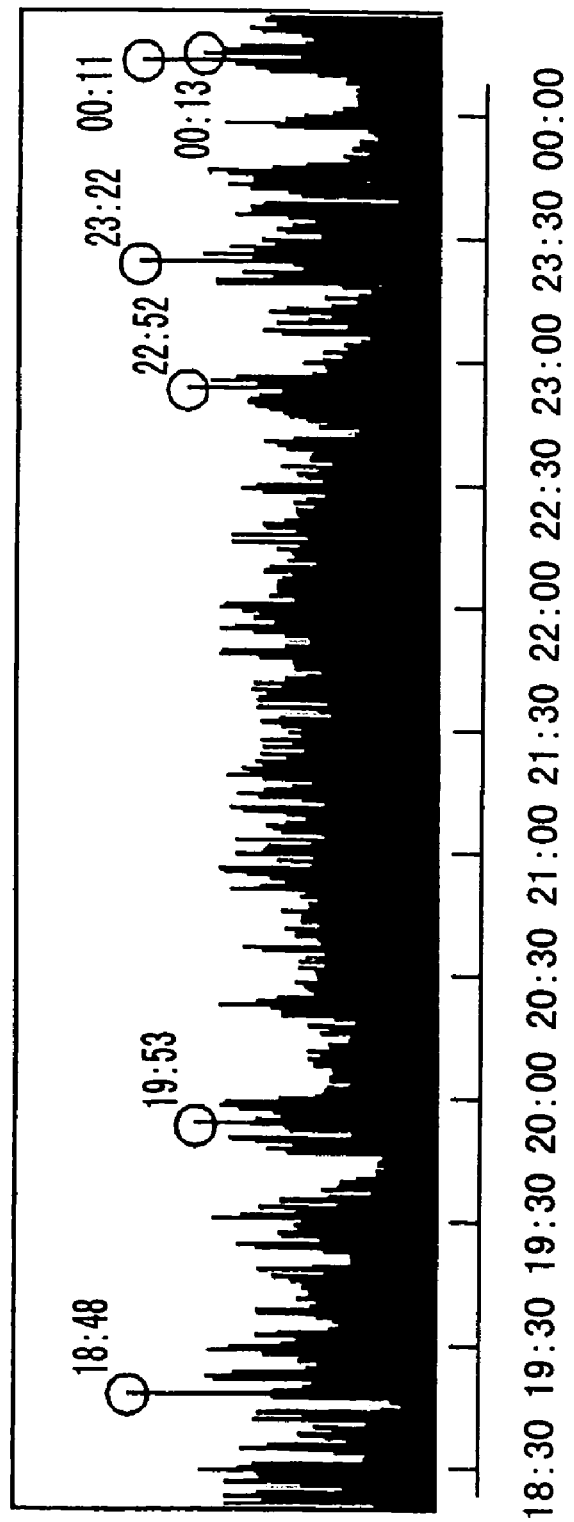
FIG. 11 is a graph showing an example of the detection results for an audio signal according to the conventional method.
Figure 12:
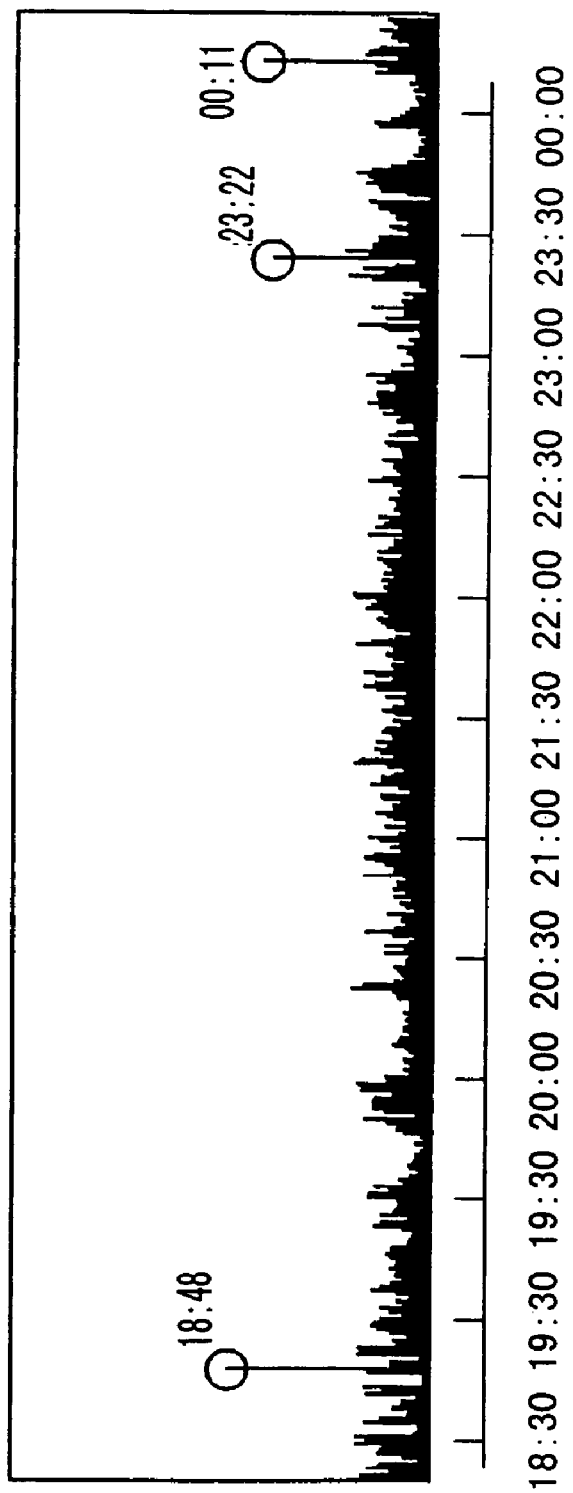
FIG. 12 is a graph showing an example of the detection results for an audio signal according to the second embodiment of the present invention.

Next, an example of an operational experiment of the high-speed signal search device according to the present embodiment will be given. The present apparatus is mounted on a work station (SGI O₂), and FIG. 11 and FIG. 12 show the results of the detection of an audio signal using a television broadcast as the subject matter. In both figures, the vertical axis is the similarity value, and the horizontal axis shows the time. A commercial (15 seconds) was used as the reference signal, and the detection was carried out using the recording of an actual television broadcast (Jan. 22, 1998, from 18:22 to 00:22) as an input signal. Moreover, in this experiment, the sampling frequency was 11.025 kHz, the dimension of the feature vector was 7, an the number of bins of the elements of each feature vector was 3.

FIG. 11 shows the case when the window was not partitioned, that is, when the present method was not applied, and FIG. 12 shows the case when the window was partitioned into 8 sections by applying the present method. In the respective figures, the parts with the mark 'o' denote locations found the present method. Manual confirmation showed that there were three correct locations in the present experiment:

18:48, 23:22, 00:11.

In FIG. 11, three extraneous locations were detected, and in FIG. 12, the correct detection results were obtained.

In addition, generally the larger the ratio of the similarity value in locations that should be searched and the similarity value of locations that should not be searched, the margin with respect to setting the setting values becomes large, and thus a stable search is possible. In the present experiment, for the case shown in FIG. 12 the value of this ratio has become large in comparison to the case shown if FIG. 11, and the effect of partitioning the windows clearly appears.

Figure 13:
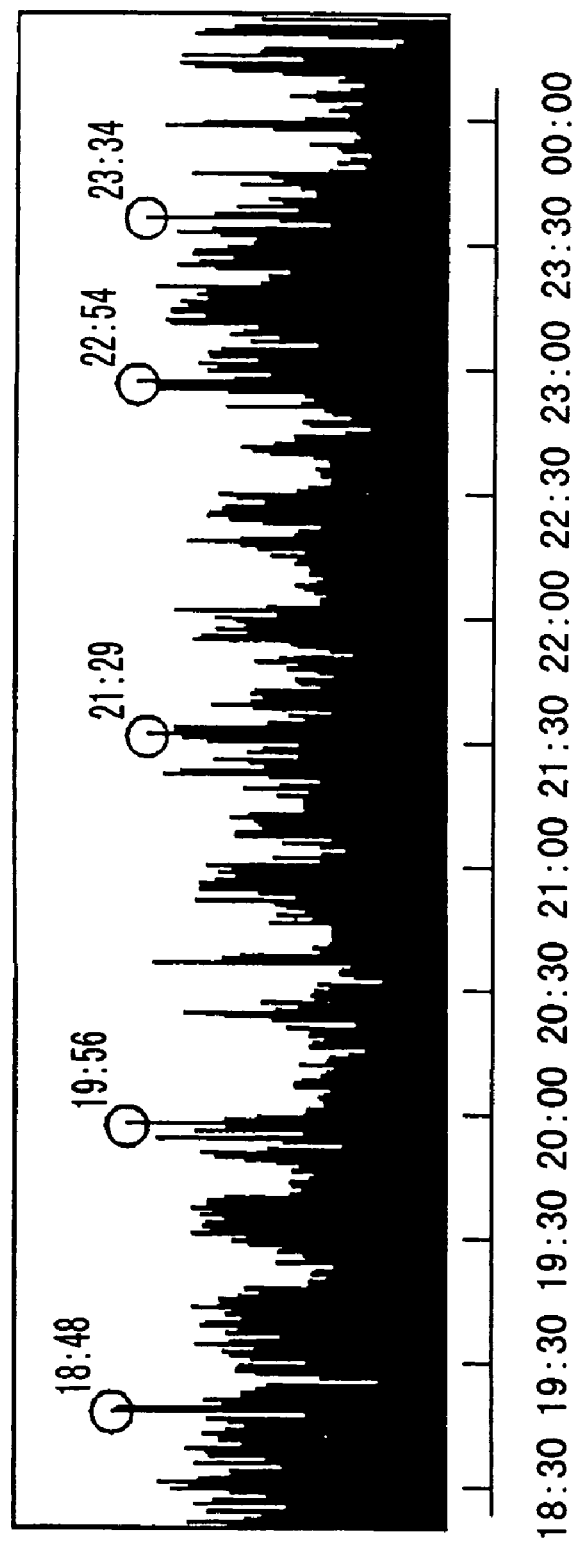
FIG. 13 is a graph showing an example of the detection results for an image pattern according to the conventional method.
Figure 14:
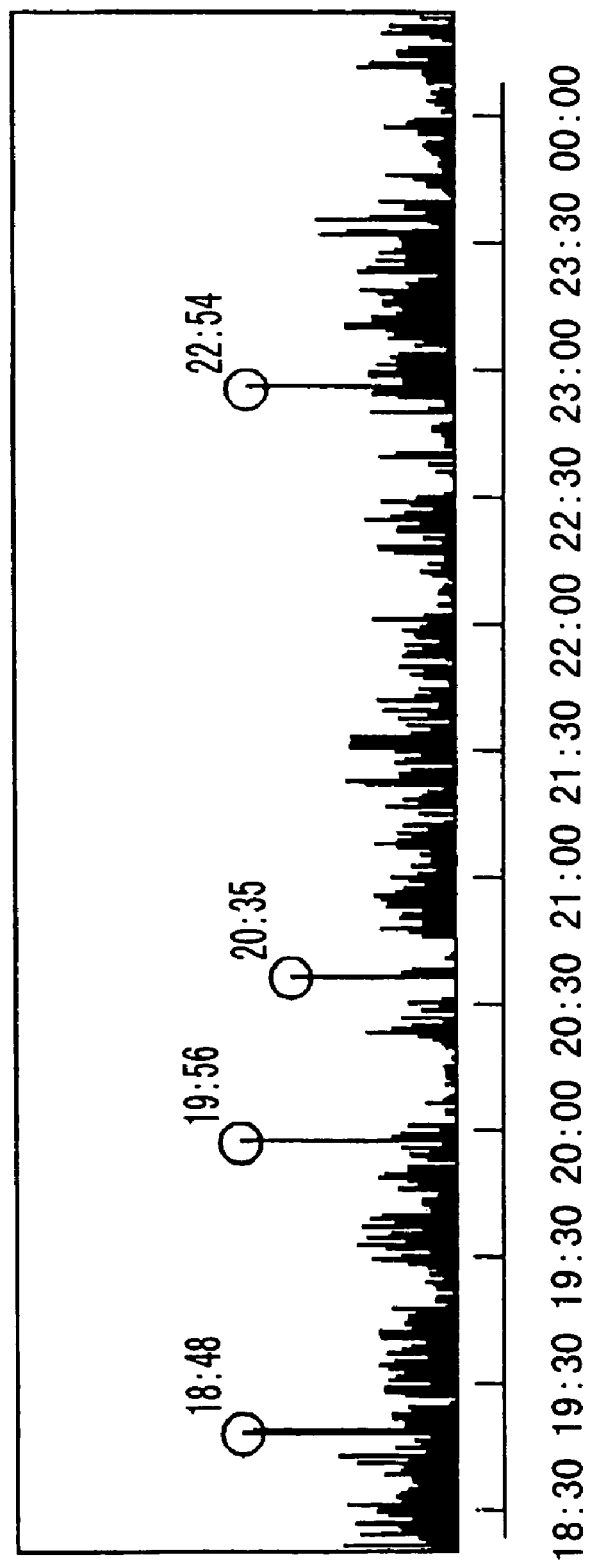
FIG. 14 is a graph showing an example of the detection results for an image pattern according to the second embodiment of the present invention.

In addition, the results of signal detection for an image pattern are shown in FIG. 13 and FIG. 14. In both cases, the vertical axis is the similarity value and the horizontal axis shows the time. In these cases, the detection is carried out using as the reference signal color information obtained from an image of a commercial (15sec) different from that shown in FIG. 11 and FIG. 12, and using as the input signal color information obtained by recording an actual broadcast (Jan. 22, 1998, from 18:22 to 18:26). Moreover, in this experiment the dimension of the feature vector was 3 and the number of bins of the elements of each feature vector was 8.

FIG. 13 shows the case when the window is not partitioned (that is, the case when the present method is not applied), and FIG. 14 shows the case when the window is partitioned into 8 sections by applying the present method. In the respective figures, the parts with the mark 'o' denote locations found by the present method. Manual confirmation showed that there were four correct locations in the present experiment:

18:48, 19:56, 20:35, 22:54.

In FIG. 13, one location among the correct locations (20:35) was not detected, and two extraneous locations were detected, while in contrast, in FIG. 14, the correct detection results were obtained.

Third Embodiment

Next, the third embodiment of the present invention will be explained referring to the figures.

In the first embodiment and the second embodiment, methods were explained wherein the position in a signal similar to a pre-recorded reference signal was detected.

However, in these methods, there is the problem that when detecting a signal based on a plurality of reference signals, the number of times that the detection processing is repeated is equal to at least the number of reference signals, the amount of calculation increased, and the detection speed decreased.

Thus, in the third embodiment, a high-speed signal search method will be explained wherein it is possible to detect a signal with less processing than conventionally even when the signal is detected based on a plurality of reference signals.

Figure 15:
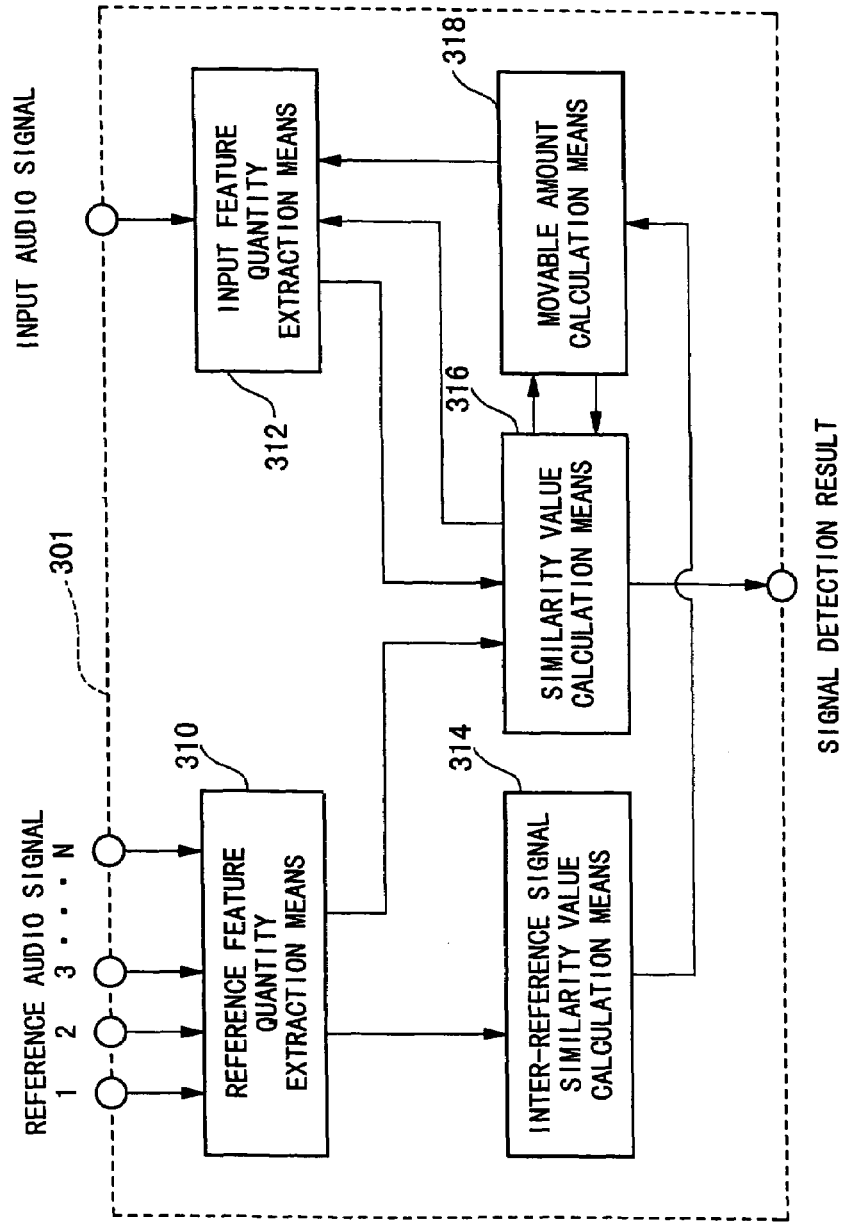
FIG. 15 is a block diagram showing an example of the structure of the high-speed signal search device according to the third embodiment of the present invention.

FIG. 15 is a block diagram showing an example of the structure of the high-speed signal search device applying the high-speed signal search method according the third embodiment of the present invention. In the present invention, it is possible to use a variety of object signals for processing, but here, as one example of the processing of this object signal, an audio signal will be used. In FIG. 15, the present device 1 comprises the reference feature quantity calculation means 310, the input feature quantity calculation means 312, the inter-reference signal similarity value calculation means 314, the similarity value calculation means 316, and the skip width calculation means 318.

Here, the high-speed signal search device shown in FIG. 15 specifically comprises a computer made up of a CPU (central processing unit) and its peripheral circuits. This computer carries out the functions of each device shown in FIG. 15 by being controlled by a control program recorded on a specified recording medium (magnetic disc, semiconductor memory, etc.). Moreover, it is possible to distribute this computer program via a communication circuit.

The present device 1 uses a pre-recorded reference signal (that is, the sample audio signal to be detected) and the input audio signal (that is the audio signal to be detected) as input, and detects from the input audio signal locations where the similarity value of the reference audio signal and the input audio signal exceeds a specified threshold value θ.

The reference feature quantity calculation means 310 generates a feature quantity sequence for a plurality of reference audio signals. In addition the input feature quantity calculation means 312 generates a feature quantity series from the input audio signal, and sets the window (hereinbelow, referred to at the "input signal window") based on this feature quantity sequence.

The inter-reference signal similarity value calculation means 314 calculates the similarity value between each (feature quantity sequence of) the reference audio signal (hereinbelow, referred to as "the inter-reference signal similarity value"). The similarity value calculation means 316 calculates the similarity value (hereinbelow, referred to as the "input signal similarity value") of the feature quantity sequence generated by the reference feature quantity calculation means 310 and the feature quantity sequence in the input signal window set by the input feature quantity calculation means 312.

The skip width calculation means 318 calculates a parameter (for example, the upper bound of the similarity value) that defines the range of the input signal value (between the input audio signal and the reference audio signal) in the input signal window in the neighborhood of the input signal window corresponding to this input signal similarity value based on the inter-reference signal similarity value calculated by the inter-reference signal similarity value calculation means 314 and the input signal similarity value calculated by the similarity value calculation means 316. Additionally, the skip width calculation means 318 calculates the skip width of the input signal window based on the value of this parameter.

Figure 16:
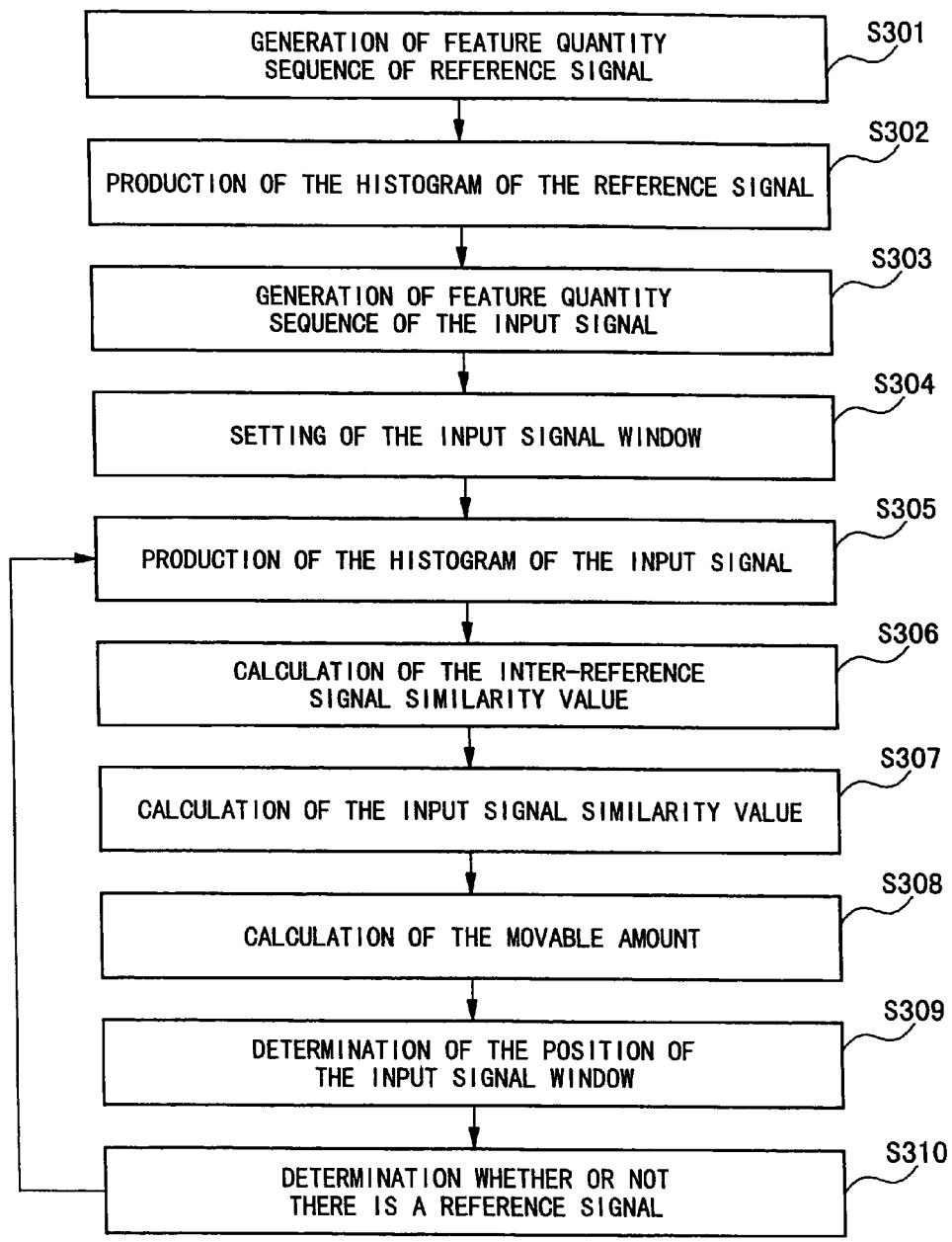
FIG. 16 is a flow chart showing an example of the operation of the high-speed signal search device according to the third embodiment of the present invention.

Next, referring to FIG. 16, the operation of the present device will be concretely explained. In order to simplify the explanation, the length of all the reference audio signals are equal. Moreover, actually the present device can be applied even when length of the reference audio signals are not necessarily the same.

The reference feature quantity calculation means 310 first reads all the given reference signals. Next, the reference feature quantity calculation means 310 carries out extraction of the feature quantities for the reference audio signals that have been read (step S 301). In the present invention, it is possible to use a variety of feature quantities, but here, as one example of the feature quantity, a spectral feature will be used. In this case, the reference feature quantity calculation means 310 extracts the feature quantities (that is, the time series of the 7-dimensional vector) using the same method (see FIG. 10) as the reference feature quantity extraction means 201 of the second embodiment, and thus, here its explanation will be omitted.

Next, the reference feature quantity calculation means 310 produces histograms of these feature vectors based on the time sequence of the above feature vector (step S 302). Here, this histogram is produced by partitioning into a plurality of bins the range of values (from the smallest value to the largest value) that each element of the feature vector can take. The reference feature quantity calculation means 310 produces the histograms using the same method as the similarity value calculation means 203 (second embodiment), and thus here its explanation is omitted.

Moreover, in the present embodiment, a histogram is produced for all (the time sequence of the feature vector) of one reference audio signal, but as shown in the second embodiment, it is alternatively possible partition the (time sequence of the feature vector of) the reference audio signal, and produce histograms for each of (the time sequence of the feature vector of) the reference audio signals after partitioning. There can be, for example, 4 partitions. In this case, 4 histograms are produced for one reference audio signal.

The input feature quantity calculation means 312 first reads the input audio signal. Next, the input feature quantity calculation means 312 carries out extraction of the feature quantities for the input audio signal that has been read (step S 303). Here the input feature quantity calculation means 312 extracts the feature quantities using the same method as the reference feature quantity calculation means 310.

Next, the input feature quantity calculation means 312 sets the length of the input signal window so as to be the same as that of the reference audio signal provided by the reference feature quantity calculation means 310 for (the time series of the feature vector of) the extracted feature quantities (step S 304). Moreover, at the beginning of the processing, the position of the input signal window is set at the head of the feature quantity sequence produced from the input audio signal, but as the processing progresses, by a method described below, this feature quantity sequence is moved sequentially in the direction of the time axis. This skip width is calculated by the similarity value calculation means 316.

Next, the input feature quantity calculation means 312 produces histograms for these feature vectors based on the time series of the feature vectors in the input signal window (step S 305). Here, this histogram is produced by partitioning the range of values (from the smallest to the largest) that each element of the feature vector can take into a plurality of bins, the input feature quantity calculation means 312 produces the histograms using the same method as the reference feature quantity calculation means 310, and thus, its explanation is omitted here.

Moreover, when the reference feature quantity calculation means 310 partitions the reference audio signal (as in the second embodiment) in the direction of the time axis, and the input feature quantity calculation means 312 also, in the same manner, partitions (the time series of the feature quantity in) the input signal window in the direction of the time axis. The number of partitions is the same as the number of partitions in the reference feature quantity calculation means 310. Therefore, in the input feature quantity calculation means 312, the same number of histograms as were produced from one reference audio signal in the reference feature quantity calculation means 310 is produced from the input audio signal in the input signal window.

The inter-reference signal similarity value calculation means 314 first reads the histograms (the histograms of each of the reference audio signals) supplied from the reference feature quantity calculation means 310. Here, in order to simplify the explanation, the case is considered wherein the reference audio signal is not partitioned (however, this is only to prevent the treatment of the subscripts from becoming complicated, and the present invention can be applied to the case wherein the reference audio signal is partitioned). The histograms supplied from the reference feature quantity calculation means 310 are $G^1, G^2, \ldots, G^N$, where N is the number of reference audio signals.

The inter-reference signal similarity value calculation means 314 calculates the similarity values between two extracted reference audio signals for all combinations of two reference audio signals from among N reference audio signals (step S 306). Here, the similarity value S (g, h) between the histogram g of the $k^{th}$ reference audio signal and the histogram h of the $m^{th}$ reference audio signal is defined by the following equation:

$$S(g, h) = \frac{1}{D}\sum_{j=1}^{L} \min(g_j, h_j) \quad (5)$$

Here, D is the total number of histograms, L is the number of histogram bins (in the above example, 3 to the power of 7), $g_j$ is the value of the $j^{th}$ bin of histogram g, $h_j$ is the value of the $j^{th}$ bin of histogram h, and $\min(g_j, h_j)$ is the smaller value between $g_j$ and $h_j$.

Moreover, when the reference feature quantity calculation means 310 partitions the reference audio signal in the direction of the time axis (as in the second embodiment), the inter-reference signal similarity value calculation means 314 carries out the calculation of the similarity values for the partitioned parts corresponding to the two reference audio signals. The result of the calculation of the similarity values is stored in a memory means (not shown in the figures), and supplied to the skip width calculation means 318.

The similarity value calculation means 316 first reads the histogram supplied by the reference feature quantity calculation means 310 and the histogram supplied by the input feature quantity calculation means 312. Here, in order to simplify the explanation, the case when the reference audio signal and the input audio signal are not partitioned is considered (however, this is only to prevent the treatment of the subscripts from becoming complicated, and the present invention can be applied even in the case that the reference audio signal and the input audio signal are partitioned). Here, the histograms supplied from the reference feature quantity calculation means 310 are $G_1, G_2, \ldots, G_N$, where N is the number of reference audio signals, and the histogram supplied from the input feature quantity calculation means 312 is H.

Next, the similarity value calculation means 316 selects one histogram of a reference audio signal, and calculates the similarity value between the selected histogram and the histogram of the input audio signal (step S 307). The similarity value S(g, h) between the histogram g of the reference audio signal and the histogram h of the input audio signal is defined b the following equation:

$$S(g, h) = \frac{1}{D} \sum_{j=1}^{L} \min(g_j, h_j) \qquad (6)$$

Here, D is the total number of histograms, L is the number of histogram bins (in the above example, 3 to the power of 7), $g_j$ is the value of the $j^{th}$ bin of histogram $g_j$, $h_j$ is the value of the $j^{th}$ bin of histogram h, an d min $(g_j, h_j)$ is the smaller value between $g_j$, and $h_j$.

In the present embodiment, N reference audio signals are input, but the calculation of the similarity value is carried out once for only one of the reference audio signals. The reference audio signal selected for use in the calculation of the similarity value will have a similarity value whose upper bound is expected to exceed a threshold value θ. Because the skip width calculation means 318 explained below determines which of the reference audio signals fulfills this criterion, the similarity value calculation means 316 obtains this information from the skip width calculation means 318.

Moreover, in the case that the reference audio signal and the input audio signal are partitioned in the direction of the time axis (as in the second embodiment), the calculation of the similarity value is carried out for one partitioned part of the (partitioned) reference audio signal and input audio signal.

The similarity value calculation means 316 supplies the calculated similarity values to the skip width calculation means 318. In addition, when the similarity value exceeds the threshold value θ (the case that the reference audio signal and the input audio signal are partitioned in the direction of the time axis, and when for all partitions, the similarity value exceeds the threshold value θ), because this means that the reference audio signal has been found in the input audio signal, the similarity value calculation means 316 outputs the number of the reference audio signal and the present position of the input signal window.

The skip width calculation means 318 first reads from the similarity value calculation means 316 the similarity value $S^k$ between the input audio signal and the $k^{th}$ reference audio signal. Next, the skip width calculation means 318 calculates the skip width $w_k$ (step S 308). Here, the skip width $w_k$ is found with the following equation:

$$w_k = \begin{cases} \text{floor}(D(\theta - S^k)) + 1 & (S^k < \theta) \\ 1 & (\text{otherwise}) \end{cases} \qquad (7)$$

Here, the unit of the skip width wk is the number of feature vectors, floor ( ) denotes the cutoff for rounding off the number, D is the total number of histograms of the feature vectors of the $k^{th}$ reference audio signal that satisfies $S=S^k$, and θ is the above threshold value.

Eq. 7 means that if S<θ at the present point, even if the input signal window is moved at least one feature vector interval ($w_k$–1), the total similarity value $S^k$ will not exceed the threshold value θ. This can be easily understood by considering the cases where the feature vector that is outside the input signal window is contributing nothing to the overlap of all histograms when the input signal window is moving and the feature vector within the input signal window is contributing all of the overlap to histograms (that is, when the total similarity value $S^k$ arrives most quickly at the threshold value θ). That is, because in this kind of case the similarity value increases the most, under this supposition, when the input signal window is moved at least the feature vector interval ($w_k$–1), the upper bound of the total similarity value $S^k$ becomes the threshold value θ.

In contrast, if $S_k \geq \theta$, in order to find the local peak of the similarity value, then $w_k$=1, and a search is carried out that does not skip any windows.

The above described processing is for one (that is, the k) reference audio signal. In the case that there is a plurality of reference audio signals, in the conventional method, the skip width for each reference audio signal is found by simply repeating the processing at least the number of times equal to the number of reference audio signals (this is known as the iteration method). In contrast, when the similarity value $S^k$ for the $k^{th}$ reference audio signal is obtained, the present method is characterized in finding the skip width for a reference audio signal other then the $k^{th}$ signal based on the similarity value $S^k$. Thus, the number of similarity value computations can be decreased in comparison to the iteration method.

The following is an explanation of the method of decreasing the number of similarity value computations. The histograms $G^k$ and $G^m$ are produced respectively for the two reference audio signals $R^k$ and $R^m$, and the histogram is prepared from the input audio signal I.

Here, it is assumed that the total number of histograms $G^k$ and $G^m$ is equal, and the reference audio signal and the input audio signal are not partitioned in the direction of the time axis. In addition, it is also assumed that the input signal similarity value $S^k$ between the histogram $G^k$ and the histogram H is already known.

At this time, if the histogram $G^k$ and the histogram $G^m$ resemble each other closely, the input signal similarity value $S^m$ between the histogram H and the histogram $G^m$ is not calculated, and the upper bound of the input signal similarity value $S^m$ is obtained. That is, if the reference signal similarity value between histogram $G^k$ and histogram $G^m$ is $S^{km}$, when all of the parts that do not match between the histogram $G^k$ and the histogram $G^m$ contribute to the increase in the input signal similarity value $S^m$, the input signal similarity value $S^m$ has reached its upper bound. This is shown by the following equation:

$$S^m \leq S^k + (1 - S^{km}) \quad (8)$$

Here, because originally $S^m \leq 1$, Eq. 8 is only valid when $S^k \leq S^{km}$.

In contrast, if the histogram $G^k$ and the histogram H resemble each other closely, when all of the parts that do not match between the histogram $G^k$ and the histogram H contribute to the increase in the input signal similarity value $S^m$, the input signal similarity value $S^m$ has reached its upper bound. This is shown by the following equation:

$$S^m \leq S^{km} + (1 - S^k) \quad (9)$$

Here, because originally $S^m \leq 1$, Eq. 9 is only valid when $S^k < S^{km}$.

When Eq. 8 and Eq. 9 are combined, the following equation is obtained:

$$S^m \leq 1 - |S^k - S^{km}| \quad (10)$$

That is, the larger the difference between the input signal similarity value $S^k$ and the reference signal similarity value $S^{km}$, the smaller the upper bound of the input signal similarity value $S^m$. In this situation, the skip width $w_m$ becomes large.

$$w_m = \begin{cases} \text{floor}(D(\theta - S^m)) + 1 & (S^m < \theta) \\ 1 & (\text{otherwise}) \end{cases} \quad (11)$$

That is, the smaller the input signal similarity value $S^m$, the larger the skip width $w_m$.

As described above, according to the present invention, if the inter-reference signal value $S^{km}$ of the two reference audio signals $R^k$ and $R^m$ is known, when the input signal similarity value $S^k$ between the reference audio signal $R^k$ and the input audio signal I is obtained, it is possible to find the skip width for the reference audio signal $R^m$, not just the skip width for the reference audio signal $R^k$ based on this input signal similarity value $S^k$. Thus, each time the input signal similarity value $S^k$ between the $k^{th}$ reference audio signal $R^k$ and the input audio signal I is obtained (in the similarity value calculation means 316), the skip width calculation means 318 extracts (from the inter-reference signal similarity value calculation means 314) the inter-reference signal similarity value between the reference audio signal $R^k$ and the reference audio signal other than this reference audio signal $R^k$, and using this inter-reference signal similarity value and Eq. 10 and Eq. 11, the skip width (of the input signal window) for all reference audio signals can be found. Additionally, when the skip width found in this manner is larger than the skip width found up to that time, the skip width calculation means 318 updates the skip width.

The similarity value calculation means 316 supplies the updated skip width $w_i$ (i=1, . . . , N) to the input feature quantity calculation means 312. The input feature quantity calculation means 312 transfers only the smallest skip width among the skip widths $w_i$ to the input signal window (step S 309). Subsequently, the above processing (producing a histogram, calculating the similarity value, calculating the skip width, etc.) is repeated in the same manner (step S 310). In addition, when the input signal window passes the end of the input audio signal (of the feature vector of the time series) due to the moving of the input signal window, the search processing ends because the entire input audio signal has been searched.

Figure 17:
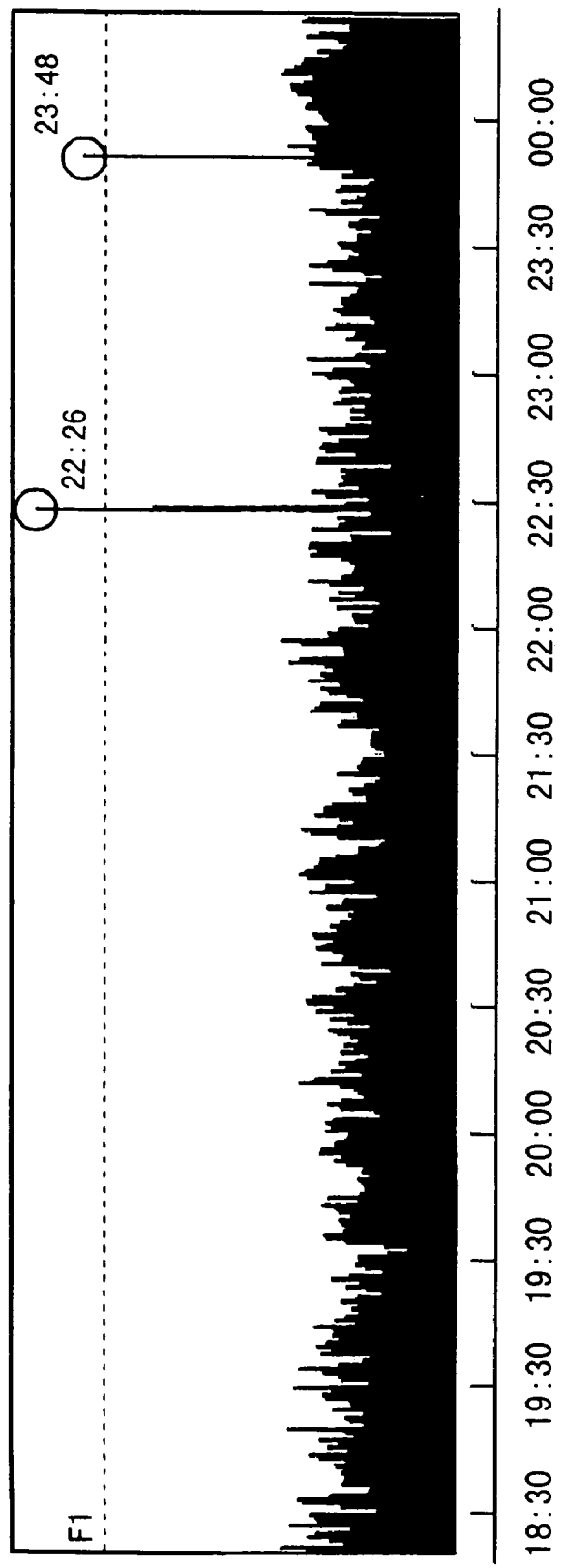
FIG. 17 is a graph showing an example of the detection results for an audio signal according to the third embodiment of the present invention.

Next, an example of the experimental operation of the high-speed signal detection device according to the present embodiment will be explained. In order to examine the effects of the present embodiment, a search experiment was carried out using the audio signal of a 6-hour television broadcast as the input signal, and the audio signal of a 15-second commercial was used as the reference signal. In the present device, only the number of checks will be compared since with respect to precision the case of checking the reference signals separately is identical. In addition, because a complete search is always carried out for the case in which the similarity value exceeds the threshold value, here, the subject matter of the examination is what percentage the number of checks is when the similarity value is below the threshold value in comparison to the number of checks when checking reference signals separately (in this application, this is referred to as the "check number ratio"). For the parameters of the search, the sampling frequency=11.025 kHz, the number of band filters=7, the length of the window for the frequency analysis=60 ms, the window shift=10 ms, the number of bins in each feature dimension=3, the number of window partitions per hour=1, and the threshold value $\theta$=0.8. An example of the search results is shown in FIG. 17. The vertical axis is the similarity value, and the horizontal axis is the time. In addition, the mark 'o' denotes a detected location, and the broken line is the threshold value $\theta$ (0.8).

Figure 18:
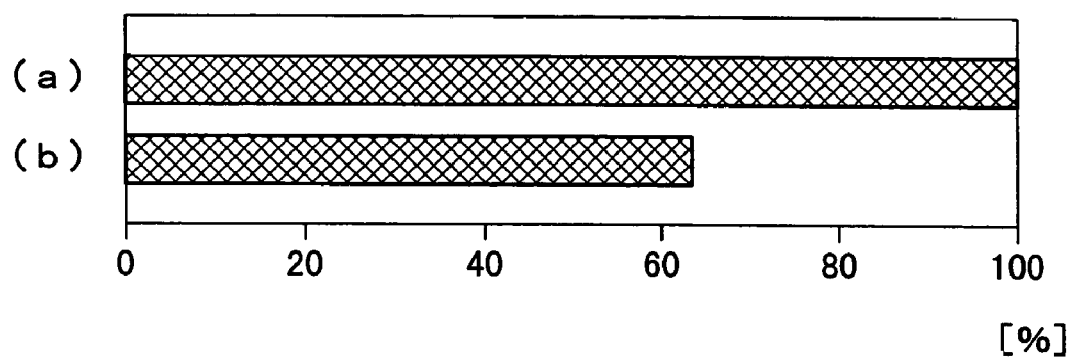
FIG. 18 is a graph showing an example of the relationship between the similarity value between reference signals and the decrease in the effect of the number of checks according to the third embodiment of the present invention.

FIG. 18 shows the results of the experiment. Experiment example (a) in FIG. 18 is the case when the different products of three commercials are randomly selected, experiment example (b) is the result of the case when the same product with very similar sound in three commercials is used as the reference signal. The similarity values between the reference signals is experiment example (a) were 0.11, 0.22, and 0.23, and in experiment example (b) were 0.72, 0.75, and 0.88. In the case of experiment example (a), the result of the decrease in the number of checks is small (the check number ratio is 99.9%), and in the case of experiment example (b), the number of checks when the similarity value was below the threshold value was less than ⅔ (the check number ratio was 62.7%).

In this manner, the present apparatus is particularly effective when the similarity value between reference signals is high.

Addendum

Above, the embodiments of this invention were described in detail referring to the figures, but the concrete structure is not limited to these embodiments, and included in this invention are such alterations that do not exceed the design scope of the gist of this invention.

For example, in the above-described first through third embodiments, an explanation of a high-speed signal search device characterized by a similarity value calculation using a histogram and a skip width calculation based on the similarity value, but the high-speed signal search method according to the present invention is not necessarily limited to these two features, and a special effect is achieved in comparison to the conventional technology even when just one among these features is used.

In addition, in the above-described first through third embodiments, an audio signal is used as the signal that is the object of processing, but as described in the experiment examples if FIG. 13 and FIG. 14, signals representing color information (R, G, B, etc.) of an image can also be used.

In addition, as one example of a feature quantity, in the first embodiment an audio signal zero crossing was used, and in the second and third embodiments spectral features were used, but the feature quantities used in the present invention are not limited thereto, and other feature quantities can be used.

In addition, in each of the above-described embodiments, the case of carrying out signal detection based on the similarity value of a histogram was described, but instead of a similarity value, the signal detection can be carried out using distance (Euclidean distance, L1 distance, etc.). In this case, it goes without saying that the size relationships of the values in the case based on similarity values is reversed, and the same results can be obtained.

In addition, in each of the above-described embodiments, the high-speed signal search apparatus was described as an independent unit, but it is possible to construct an automatic control apparatus for a video using this apparatus. That is, combining the present high-speed signal search device with a video device, at the same time a control device can be provided that detects the generation of a specified audio signal (theme song, etc.) or a specified image pattern, etc., by the present high-speed signal search device, and controls the recording function, etc., of the video device according to this search result. Thereby, it is possible to realize an automatic video control device that can automatically activate the video recording function or stop the recording function according to the start or end of a specified program, or record indexed information.

Furthermore, in this manner, it is possible to automatically record by detecting the time that a specified commercial is broadcast from the audio signal of the broadcast, and start and stop video recording by detecting a specified theme song. In addition, it is possible to automatically monitor the time that the sound of applause occurs and the time that laughter occurs from the broadcast, and search for a specified scene. Furthermore, this processing can be applied not only to audio signals, but to general signals such as an image pattern.

What is claimed is:

1. A high-speed signal search method characterized in providing:
    a first step that generates a feature quantity sequence for a plurality of pre-recorded reference signals;
    a second step that generates a feature quantity sequence for the input signal that has been input;
    a third step that sets the input signal window for the feature quantity sequence generated in the second step;
    a fourth step that calculates an inter-reference signal similarity value that shows the degree of similarity between the feature quantity sequence related to a former reference signal and the feature quantity sequence related to a later reference signal for two reference signals among the plurality of reference signals;
    a fifth step that calculates the input signal similarity value showing the degree of similarity between the feature quantity sequence generated in the first step and the feature quantity sequence in the said input signal window for each reference signal among said plurality of reference signals;
    a sixth step that calculates a skip width showing the amount that the input signal window can move based on the inter-reference signal similarity value calculated in the fourth step and the input signal similarity value calculated in the fifth step; and
    a seventh step that determines the position of the input signal window based on the skip width calculated in the sixth step and sets the input signal window at that position; and further,
    calculates an input signal similarity value for each position of the input signal window by repeating the fifth step to the seventh step; and
    determines whether or not the reference signal exists at the position that the input signal window presently shows in the input signal based on the result of comparing the input signal similarity value and the predetermined threshold value.

2. A high-speed signal search method according to claim 1 characterized in providing:
    a pre-check step which finds in advance the similarity value between an input signal and a reference signal for a plurality of locations on said input signal;
    pre-check similarity value statistics step which find the mean and the standard deviation of this similarity value for the plurality of similarity values obtained in said pre-check step;
    a threshold value determination step which determines said threshold value based on the mean and standard deviation obtained in said pre-check similarity value statistics step.

3. A high-speed signal search method according to claim 1 characterized in said input signal similarity value being the intersection similarity value.

4. A high-speed signal search method according to claim 1 characterized in said input signal window having the same time length as said reference signal in the direction of the time axis.

5. A high-speed signal search method according to claim 1 characterized in said skip width being calculated by $$w = \begin{cases} \text{floor}(D(\theta - S)) + 1 & (S < \theta) \\ 1 & (\text{otherwise}) \end{cases}$$

where:
    $\theta$ is said threshold value;
    S is said input signal similarity value;
    D is the total frequency of said feature quantity sequence; and
    Floor { } denotes the cutoff for rounding off the number.

6. A high-speed signal search method according to claim 1 characterized in said reference signal and said input signal being an audio signal.

7. A high-speed signal search method characterized in providing:
    a first step that generates a feature quantity sequence for a plurality of pre-recorded reference signals;
    a second step that produces histograms for the feature quantity sequences generated in the first step;
    a third step that generates a feature quantity sequence for an input signal that has been input;
    a fourth step that sets the input signal window for the feature quantity sequence generated in the third step;
    a fifth step that produces histograms for the feature quantity sequences of the input signal window;
    a sixth step that calculates an inter-reference signal similarity value showing the degree of similarity between the histogram related to a former reference signal and the histogram related to a later reference signal for two reference signals among the plurality of reference signals;

a seventh step that calculates the input signal similarity value showing the degree of similarity between the histograms generated in the second step and the histograms generated in the fifth step for each reference signal among the plurality of reference signals;

an eighth step that calculates a skip width showing the amount that the input signal window can move based on the inter-reference signal similarity value calculated in the sixth step and the input signal similarity value calculated in the seventh step; and a ninth step which determines the position of the input signal window based on the skip width calculated in the eighth step and sets the input signal window to this position; and further calculates the input signal similarity value based on each position of the input signal window by repeating the fifth step to the ninth step; and determines whether or not the reference signal exists at the position that the input signal window presently shows in the input signal based on the result of comparing the input signal similarity value and the predetermined threshold value.

8. A high-speed signal search method according to claim 7 characterized in:

said feature quantity sequence being a sequence of zero-crossing feature quantities of the reference signal and the input signal, and its integral value; and said histogram being produced by partitioning the range of value that said zero-crossing number and its integral value can take into a plurality of bins, and calculates the feature quantity sequence corresponding to each of said bins based on said zero-crossing number and its integral value.

9. A high-speed signal search method according to claim 7 characterized in:

said feature quantity sequence is a sequence of feature vectors having a plurality of frequency band components as elements; and said histogram being produced by partitioning the range of values that each of the elements of said feature vector can take into a plurality of bins, and calculating the feature quantity sequence corresponding to each of said bins based on the value of said elements.

* * * * *